United States Patent
Katsumata et al.

(10) Patent No.: US 11,206,386 B2
(45) Date of Patent: Dec. 21, 2021

(54) INFORMATION PROCESSING APPARATUS AND INFORMATION PROCESSING METHOD

(71) Applicant: SONY CORPORATION, Tokyo (JP)

(72) Inventors: Mitsuru Katsumata, Tokyo (JP); Mitsuhiro Hirabayashi, Tokyo (JP); Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 15/772,130

(22) PCT Filed: Dec. 28, 2016

(86) PCT No.: PCT/JP2016/089038
§ 371 (c)(1),
(2) Date: Apr. 30, 2018

(87) PCT Pub. No.: WO2017/122543
PCT Pub. Date: Jul. 20, 2017

(65) Prior Publication Data
US 2018/0316903 A1 Nov. 1, 2018

(30) Foreign Application Priority Data

Jan. 13, 2016 (JP) .............................. JP2016-004120
Jul. 27, 2016 (JP) .............................. JP2016-147023

(51) Int. Cl.
*H04N 13/161* (2018.01)
*H04N 19/70* (2014.01)
(Continued)

(52) U.S. Cl.
CPC ........... *H04N 13/161* (2018.05); *H04N 13/00* (2013.01); *H04N 19/597* (2014.11); *H04N 19/70* (2014.11);
(Continued)

(58) Field of Classification Search
CPC ........... H04N 13/161; H04N 21/23418; H04N 21/85406; H04N 13/00; H04N 19/597; H04N 19/70
See application file for complete search history.

(56) References Cited

U.S. PATENT DOCUMENTS

| | | | |
|---|---|---|---|
| 2003/0214502 A1* | 11/2003 | Park | G06T 15/205 345/420 |
| 2009/0148038 A1* | 6/2009 | Sawachi | H04N 13/128 382/154 |

(Continued)

FOREIGN PATENT DOCUMENTS

| | | |
|---|---|---|
| CN | 104429063 A | 3/2015 |
| EP | 2195952 B1 | 3/2011 |

(Continued)

OTHER PUBLICATIONS

Oct. 16, 2018, European Search Report issued for related EP application No. 16885143.4.

(Continued)

*Primary Examiner* — Joseph G Ustaris
*Assistant Examiner* — Jill D Sechser
(74) *Attorney, Agent, or Firm* — Paratus Law Group, PLLC

(57) ABSTRACT

The present disclosure relates to an information processing apparatus and an information processing method, which enable efficient description of depth representation information in an MP4 file. A file generation unit samples and arranges an elementary stream obtained by encoding a depth image including pixel values, which are obtained by quantizing depth information indicating a position of each pixel in a depth direction, as well as groups samples with the same depth representation information regarding the depth image and generates the MP4 file in which the depth representation (Continued)

information of each group is described. The present disclosure can be applied to, for example, a file generation apparatus and the like.

11 Claims, 47 Drawing Sheets

(51) Int. Cl.
*H04N 19/597* (2014.01)
*H04N 13/00* (2018.01)
*H04N 21/854* (2011.01)
*H04N 21/234* (2011.01)

(52) U.S. Cl.
CPC . *H04N 21/23418* (2013.01); *H04N 21/85406* (2013.01)

(56) References Cited

U.S. PATENT DOCUMENTS

| | | | | |
|---|---|---|---|---|
| 2009/0161989 A1* | 6/2009 | Sim | | H04N 19/597 |
| | | | | 382/285 |
| 2011/0314176 A1* | 12/2011 | Frojdh | | H04L 29/06027 |
| | | | | 709/236 |
| 2012/0269275 A1* | 10/2012 | Hannuksela | | H04N 19/61 |
| | | | | 375/240.25 |
| 2013/0011046 A1* | 1/2013 | Choi | | G06T 3/4007 |
| | | | | 382/154 |
| 2013/0114705 A1* | 5/2013 | Chen | | H04N 19/597 |
| | | | | 375/240.12 |
| 2013/0170763 A1* | 7/2013 | Shimizu | | G06T 9/004 |
| | | | | 382/238 |
| 2013/0235152 A1 | 9/2013 | Hannuksela et al. | | |
| 2014/0098868 A1* | 4/2014 | Wang | | H04N 19/31 |
| | | | | 375/240.13 |
| 2014/0192151 A1 | 7/2014 | Wang et al. | | |
| 2014/0192152 A1* | 7/2014 | Wang | | H04N 19/597 |
| | | | | 348/43 |
| 2014/0314146 A1* | 10/2014 | Fukuhara | | H04N 19/647 |
| | | | | 375/240.08 |
| 2014/0333726 A1* | 11/2014 | Tokui | | H04N 5/208 |
| | | | | 348/46 |
| 2015/0103927 A1* | 4/2015 | Hannuksela | | H04N 19/30 |
| | | | | 375/240.26 |
| 2015/0181192 A1* | 6/2015 | Jeong | | H04N 13/271 |
| | | | | 348/42 |
| 2015/0304665 A1 | 10/2015 | Hannuksela et al. | | |
| 2016/0156943 A1* | 6/2016 | Hattori | | H04N 21/234345 |
| | | | | 725/116 |
| 2016/0191931 A1* | 6/2016 | Hannuksela | | H04N 19/105 |
| | | | | 375/240.12 |

FOREIGN PATENT DOCUMENTS

| | | |
|---|---|---|
| EP | 2871842 A1 | 5/2015 |
| JP | 2009-151758 A | 7/2009 |
| JP | 2013-128253 A | 6/2013 |
| WO | WO 2009/036980 A3 | 3/2009 |
| WO | WO 2014/107376 A2 | 7/2014 |

OTHER PUBLICATIONS

Singer et al., ISO/IEC 14496-12 & 15444-12: ISO Base Media File Format, Amendment 1, International Organisation for Standardisation, ISO/IEC JTC1/SC29/WG11, Coding of Audio, Picture, Multimedia, and Hypermedia Information, Jun. 2004, pp. 1-33, Redmond, USA.

Suzuki et al., Study Text of ISO/IEC 14496-10:2012/DAM2 MVC extension for inclusion of depth maps, International Organisation for Standardisation, ISO/IEC JTC1/SC29/WG11, Coding of Moving Pictures and Audio, Oct. 2012, pp. 1-72, Shanghai, China.

Jun. 15, 2020, Chinese Office Action issued for related CN application No. 201680078248.7.

* cited by examiner

FIG. 3

| ftyp | moov | mdat | moof | mdat | ... | moof | mdat | mfra |

FIG. 7

```
aligned(8) class SampleGroupDescriptionBox (unsigned int(32) handler_type)
extends FullBox('sgpd', version, 0) {
    unsigned int(32) grouping_type;
    if (version==1) {
        unsigned int(32) default_length;
    }
    unsigned int(32) entry_count;
    int i;
    for (i = 1 ; i <= entry_count ; i++) {
        if (version==1) {
            if (default_length==0) {
                unsigned int(32) description_length;
            }
        }
        switch (handler_type) {
            case 'vide' : // for video tracks
            VisualSampleGroupEntry (grouping_type);
            break;
            case 'soun' : // for audio tracks
            AudioSampleGroupEntry (grouping_type);
            break;
            case 'hint' : // for hint tracks
            HintSampleGroupEntry (grouping_type);
            break;
        }
    }
}
```

FIG. 8

```
class depthRepresentationInformationEntry extends VisualSampleGroupEntry( 'DEPI' ) {
string scheme_uri;
unsigned int(16) length;
unsigned int(8*length) depth_representation_information;
}
```

FIG. 9

| field name | semantics |
|---|---|
| scheme_uri | INDICATES STRUCTURE OF DEPTH REPRESENTATION INFORMATION |
| length | INDICATES LENGTH OF DEPTH REPRESENTATION INFORMATION |
| depth_representation_information | DEPTH REPRESENTATION INFORMATION |

FIG. 10

| scheme_uri | description |
|---|---|
| urn:mpeg:14496:10<br>:depth_representation_information:2015 | THE SAME STRUCTURE AS<br>Depth representation information SEI message OF<br>ISO/IEC 14496-10 |
| urn:mpeg:23008:2<br>:depth_representation_information:2015 | THE SAME STRUCTURE AS<br>Depth representation information SEI message OF<br>ISO/IEC 23008-2 |

FIG. 11

```
depth_representation_info( payloadSize ) {
    all_views_equal_flag
    if( all_views_equal_flag == 0 ) {
        num_views_minus1
        numViews = num_views_minus1 + 1
    } else    numViews = 1
    z_near_flag
    z_far_flag
    if( z_near_flag || z_far_flag ) {
        z_axis_equal_flag
        if( z_axis_equal_flag )    common_z_axis_reference_view
    }
    d_min_flag
    d_max_flag
    depth_representation_type
    for( i = 0; i < numViews; i++ ) {
        depth_info_view_id[i]
        if( ( z_near_flag || z_far_flag ) && ( z_axis_equal_flag == 0 ) )    z_axis_reference_view[i]
        if( d_min_flag || d_max_flag )    disparity_reference_view[i]
        if( z_near_flag )    depth_representation_sei_element( ZNearSign, ZNearExp, ZNearMantissa, ZNearManLen )
        if( z_far_flag )    depth_representation_sei_element( ZFarSign, ZFarExp, ZFarMantissa, ZFarManLen )
        if( d_min_flag )    depth_representation_sei_element( DMinSign, DMinExp, DMinMantissa, DMinManLen )
        if( d_max_flag )    depth_representation_sei_element( DMaxSign, DMaxExp, DMaxMantissa, DMaxManLen )
    }
    if( depth_representation_type == 3 ) {
        depth_nonlinear_representation_num_minus1
        for( i = 1; i <= depth_nonlinear_representation_num_minus1 + 1; i++ )    depth_nonlinear_representation_model[i]
    }
}
```

FIG. 12

```
depth_representation_info( payloadSize ) {
    z_near_flag
    z_far_flag
    d_min_flag
    d_max_flag
    depth_representation_type
    if( d_min_flag || d_max_flag ) disparity_ref_view_id
    if( z_near_flag ) depth_rep_info_element( ZNearSign, ZNearExp, ZNearMantissa, ZNearManLen )
    if( z_far_flag )  depth_rep_info_element( ZFarSign, ZFarExp, ZFarMantissa, ZFarManLen )
    if( d_min_flag )  depth_rep_info_element( DMinSign, DMinExp, DMinMantissa, DMinManLen )
    if( d_max_flag )  depth_rep_info_element( DMaxSign, DMaxExp, DMaxMantissa, DMaxManLen )
    if( depth_representation_type == 3 ) {
        depth_nonlinear_representation_num_minus1
        for( i = 1; i <= depth_nonlinear_representation_num_minus1 + 1; i++ )  depth_nonlinear_representation_model [i]
    }
}
```

FIG. 13

| depth_representation_type | Interpretation |
|---|---|
| 0 | Each decoded luma sample value of depth views represents an inverse of Z value that is uniformly quantized into the range of 0 to 255, inclusive. |
| 1 | Each decoded luma sample value of depth views represents disparity that is uniformly quantized into the range of 0 to 255, inclusive. |
| 2 | Each decoded luma sample value of depth views represents a Z value uniformly quantized into the range of 0 to 255, inclusive |
| 3 | Each decoded luma sample value of depth views represents a nonlinearly mapped disparity, normalized in range from 0 to 255, as specified by depth_nonlinear_representation_num_minus1 and depth_nonlinear_representation_model[i]. |
| Other values | Reserved for future use |

FIG. 14

```
aligned(8) class SampleToGroupBox extends FullBox('sbgp', version, 0) {
    unsigned int(32) grouping_type;
    if (version == 1) {
        unsigned int(32) grouping_type_parameter;
    }
    unsigned int(32) entry_count;
    for (i=1; i <= entry_count; i++) {
        unsigned int(32) sample_count;
        unsigned int(32) group_description_index;
    }
}
```

FIG. 15

```
class depthRepresentationInformationEntry extends VisualSampleGroupEntry( 'DEPI' ) {
    unsigned int(16) depth_scheme_type;
    unsigned int(16) length;
    unsigned int(8*length) depth_representation_information;
}
```

FIG. 16

| field name | semantics |
|---|---|
| depth_scheme_type | INDICATES STRUCTURE OF DEPTH REPRESENTATION INFORMATION |
| length | INDICATES LENGTH OF DEPTH REPRESENTATION INFORMATION |
| depth_representation_information | DEPTH REPRESENTATION INFORMATION |

FIG. 17

| depth_scheme_type | description |
|---|---|
| 0x0000 | THE SAME STRUCTURE AS Depth representation information SEI message OF ISO/IEC 14496-10 |
| 0x0001 | THE SAME STRUCTURE AS Depth representation information SEI message OF ISO/IEC 23008-2 |
| 0x0002-0x00FF | Reserved |
| 0x0100-0xFFFF | User defined |

FIG. 18

```
class depthRepresentationInformationEntry extends VisualSampleGroupEntry( 'DEPI' ) {
  unsigned int(16) length;
  unsigned int(8*length) depth_representation_information;
}
```

FIG. 19

| grouping_type_parameter | description |
|---|---|
| 0x0000 | THE SAME STRUCTURE AS Depth representation information SEI message OF ISO/IEC 14496-10 |
| 0x0001 | THE SAME STRUCTURE AS Depth representation information SEI message OF ISO/IEC 23008-2 |
| 0x0002-0x00FF | Reserved |
| 0x0100-0xFFFF | User defined |

FIG. 24

| ftyp | | | | | | | | | | | | | | | |
|---|---|---|---|---|---|---|---|---|---|---|---|---|---|---|---|
| moov | | | | | | | | | | | | | | | |
| | trak | | | | | | | | | | | | | | |
| | | mdia | | | | | | | | | | | | | |
| | | | minf | | | | | | | | | | | | |
| | | | | stbl | | | | | | | | | | | |
| | | | | | stsd | | | | | | | | | | |
| | | | | | | avc1 | | | | | | | | | |
| | | | | | | | avcC | | | | | | ☆ | | |
| | | | | | | | | ☆ | rinf | | | | | | |
| | | | | | | | | | | schm | | | | | |
| | | | | | | | | | | | schi | | ☆ | | |
| | | | | | | | | | | | | | | | |
| | | | | | | | | | | sbgp | | | | | |
| | | | | | | | | | | sgpd | | | | | |
| | | | | | | | | | udta | | ☆ | | | | |

FIG. 25

```
class AVCConfigurationBox extends Box( 'avcC' ) {
    AVCDecoderConfigurationRecord() AVCConfig;
    DepthRepresentationInformationBox depth; // optional
}
```

FIG. 26

```
class depthRepresentationInformationBox extends FullBox( 'DEPI' , 0, 0) {
    string scheme_uri;
    unsigned int(16) length;
    unsigned int(8*length) depth_representation_information;
}
```

FIG. 27

```
class depthRepresentationInformationBox extends FullBox( 'DEPI' ,0,0){
    unsigned int(16) depth_scheme_type;
    unsigned int(16) length;
    unsigned int(8*length) depth_representation_information;
}
```

FIG. 28

```
class VisualSampleEntry(codingname) extends SampleEntry (codingname) {
  unsigned int(16) pre_defined = 0;
  const unsigned int(16) reserved = 0;
  unsigned int(32)[3] pre_defined = 0;
  unsigned int(16) width;
  unsigned int(16) height;
  template unsigned int(32) horizresolution = 0x00480000;  // 72 dpi
  template unsigned int(32) vertresolution = 0x00480000;  // 72 dpi
  const unsigned int(32) reserved = 0;
  template unsigned int(16) frame_count = 1;
  string[32] compressorname;
  template unsigned int(16) depth = 0x0018;
  int(16) pre_defined = -1;
  // other boxes from derived specifications
  CleanApertureBox clap;  // optional
  PixelAspectRatioBox pasp;  // optional
  DepthRepresentationInformationBox depth;  // optional
}
```

FIG. 29

```
aligned (8) class DepthRepresentationInformationBox extends FullBox('DEPI', 0, 0) {
    unsigned int(32) entry_count;
    string string scheme_uri;
    int i = 0;
    for (i=0 ; i<entry_count ; i++) {
        unsigned int(32) sample_count;
        unsigned int(16) length;
        unsigned int(8*length) depth_representation_information;
    }
}
```

FIG. 30

```
class NALunitEntry extends VisualSampleGroupEntry('nalg') {
    unsigned int(8) NAL_unit[]; // end of entry
}
```

FIG. 31

```
aligned(8) class SampleToGroupBox extends FullBox( 'sbgp' , version, 0) {
    unsigned int(32) grouping_type;
    if (version == 1) {
        unsigned int(2) reserved;
        unsigned int(6) NAL_unit_type;
        unsigned int(24) NAL_unit_type_information;
    }
    unsigned int(32) entry_count;
    for (i=1; i <= entry_count; i++) {
        unsigned int(32) sample_count;
        unsigned int(32) group_description_index;
    }
}
```

FIG. 32

| description | |
|---|---|
| NAL_unit_type | TYPE OF NAL UNIT |
| NAL_unit_type_information | INFORMATION WHICH IDENTIFIES NAL UNIT IN NAL UNIT OF TYPE REPRESENTED BY NAL_unit_type |

FIG. 34

```
class SEImessageEntry extends VisualSampleGroupEntry( 'seim' ) {
    unsigned int(8) sei_message[]; // end of entry
}
```

FIG. 35

```
aligned(8) class SampleToGroupBox extends FullBox('sbgp', version, 0) {
    unsigned int(32) grouping_type;
    if (version == 1) {
        unsigned int(16) reserved;
        unsigned int(16) payloadType;
    }
    unsigned int(32) entry_count;
    for (i=1; i <= entry_count; i++) {
        unsigned int(32) sample_count;
        unsigned int(32) group_description_index;
    }
}
```

FIG. 37

```
aligned(8) class TrackReferenceBox extends Box( 'tref' ) {
    TrackReferenceTypeBox [];
}
aligned(8) class TrackReferenceTypeBox (unsigned int(32) reference_type) extends Box(reference_type) {
    unsigned int(32) track_IDs[];
}
```

FIG. 38

```
aligned(8) class DepthRepresentationSampleEntry() extends MetadataSampleEntry ( 'dprp' ) {
    DepthRepresentationConfigurationBox();
}
```

FIG. 39

```
aligned(8) class DepthRepresentationConfigurationBox extends FullBox('depC', version=0, 0) {
    unsigned int(8) depth_representation_type;
    string sample_structure_type_uri;
}
```

FIG. 40

```
aligned(8) class DepthRepresentationConfigurationBox extends FullBox( 'depC' , version=0, 0) {
    unsigned int(8) depth_representation_type;
    unsigned int(16) sample_structure_type;
}
```

FIG. 43

```
class DepthRepresentationInformationBox extends FullBox( 'DPIB' , 0, 0) {
    unsigned int(16) depth_representation_type;
}
```

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2016/089038 (filed on Dec. 28, 2016) under 35 U.S.C. § 371, which claims priority to Japanese Patent Application Nos. 2016-004120 (filed on Jan. 13, 2016) and 2016-147023 (filed on Jul. 27, 2016), which are all hereby incorporated by reference in their entirety.

TECHNICAL FIELD

The present disclosure relates to an information processing apparatus and an information processing method, and, more particularly, to an information processing apparatus and an information processing method, which enable efficient description of depth representation information in a file of ISO base media file format.

BACKGROUND ART

In recent years, the mainstream of streaming service on the Internet is over the top video (OTT-V). Moving picture experts group phase-dynamic adaptive streaming over HTTP (MPEG-DASH) is beginning to spread as this basic technology (e.g., see Non-Patent Document 1).

In MPEG-DASH, a distribution server prepares moving picture data groups with different screen sizes and encoding rates for one moving picture content, and a reproduction terminal requests a moving picture data group with the optimum screen size and encoding rate according to the condition of the transmission path, thereby realizing the adaptive streaming distribution.

Meanwhile, as a technique for realizing stereoscopic vision, there is a technique of using a texture image and depth information representing a position of a subject in a depth direction in predetermined units of regions of the texture image. The depth information can be encoded as a depth image by being quantized into values of a predetermined bit number (e.g., values from 0 to 255) to be pixel values.

Examples of a method of encoding both the texture image and the depth image include a multiview video plus depth (MVD) method (ISO/IEC 14496-10) and a high efficiency video coding multiview extension (MV-HEVC) method (ISO/IEC 23008-2).

With these encoding methods, it is possible to include depth representation information regarding the depth image, such as the type of the depth image, the maximum value and minimum value before the quantization of the depth information, and the like, in the elementary stream as supplemental enhancement information (SEI).

Therefore, when the elementary stream of the texture image and the depth image are reproduced, the depth representation information is extracted from the elementary stream, and the encoded data of the texture image and the depth image included in the elementary stream are decoded. Then, on the basis of the depth representation information, the depth information is generated from the depth image obtained as a result of the decoding, and stereoscopic vision is realized by using the texture image obtained as a result of the decoding and the depth information.

Currently, ISO/IEC 14496-15 is studied for a method of storing the elementary stream encoded by the MVD method or the MV-HEVC method in a file of ISO Base media file format (hereinafter referred to as an MP4 file).

Herein, since the processing of generating the depth information from the depth image and the processing of realizing the stereoscopic vision can be performed independently of the decoding processing, these processing are assumed to be performed in a processing unit other than a decoder. Therefore, it is desired to store the depth representation information separately from the elementary stream in the MP4 file.

However, in the MP4 file which stores the elementary stream encoded by the MVD method, information indicating whether or not an elementary stream of the depth image is included in a track of that elementary stream (hereinafter referred to as depth presence/absence information) is described in Sample Entry outside the elementary stream, but the depth representation information is not described.

Moreover, in the MP4 file which stores the elementary stream of the depth image encoded by an advanced video coding (AVC) method or a high efficiency video coding (HEVC) method, the depth presence/absence information is described in Track Reference outside the elementary stream, but the depth representation information is not described.

Therefore, even in a case where the processing of generating the depth information from the depth image and the processing of realizing the stereoscopic vision are performed in the processing unit other than the decoder, that processing unit needs to extract the elementary stream from the MP4 file and extract the depth representation information from the elementary stream, which complicates the processing.

On the other hand, in the MP4 file which stores the elementary stream encoded by the MV-HEVC method, not only the depth presence/absence information but also the depth representation information as Config information for the MV-HEVC method are described in Sample Entry outside the elementary stream.

Therefore, in a case where the processing of generating the depth information from the depth image and the processing of realizing the stereoscopic vision are performed in the processing unit other than the decoder, that processing unit only needs to extract the depth representation information directly from the MP4 file and does not need to extract the elementary stream.

CITATION LIST

Patent Document

Non-Patent Document 1: MPEG-Dynamic Adaptive Streaming over HTTP (DASH) (URL: http://mpeg.chiariglione.org/standards/mpeg-dash/media-presentation-description-and-segment-formats/text-isoiec-23009-12012-dam-1)

SUMMARY OF THE INVENTION

Problems to be Solved by the Invention

However, the depth representation information is described in units of chunks in Sample Entry in which information necessary for decoding units of chunks, which are consecutive sample groups, is described. Therefore, every time at least one of the depth representation information and the information necessary for the decoding is different between the chunks, a new Sample Entry is generated. As a result, unchanged depth representation information or information necessary for the decoding is redundantly described, and the description efficiency of the depth representation information is poor.

The present disclosure has been made in light of such a situation and enables efficient description of depth representation information in an MP4 file.

Solutions to Problems

An information processing apparatus according to a first aspect of the present disclosure includes a file generation unit which samples and arranges an encoded stream obtained by encoding a depth image, which includes pixel values obtained by quantizing depth information representing a position of each pixels in a depth direction of each pixel, as well as groups samples with the same depth representation information regarding the depth image and generates a file in which the depth representation information of each group is described.

An information processing method according to a first aspect of the present disclosure is compatible with the information processing apparatus according to the first aspect of the present disclosure.

In the first aspect of the present disclosure, the encoded stream obtained by encoding the depth image, which includes the pixel values obtained by quantizing the depth information representing the position of each of pixels in the depth direction, is sampled and arranged, as well as the samples with the same depth representation information regarding the depth image are grouped, and the file, in which the depth representation information of each group is described, is generated.

An information processing apparatus according to a second aspect of the present disclosure includes a depth information generation unit which samples and arranges an encoded stream obtained by encoding a depth image, which includes pixel values obtained by quantizing depth information representing a position of each of pixels in a depth direction, as well as groups samples with the same depth representation information regarding the depth image and generates the depth information from the depth image on the basis of the depth representation information in a file in which the depth representation information of each group is described.

An information processing method according to a second aspect of the present disclosure is compatible with the information processing apparatus according to the second aspect of the present disclosure.

In the second aspect of the present disclosure, the encoded stream obtained by encoding the depth image, which includes the pixel values obtained by quantizing the depth information representing the position of each of pixels in the depth direction, is sampled and arranged, as well as the samples with the same depth representation information regarding the depth image are grouped, and the depth information is generated from the depth image on the basis of the depth representation information in the file in which the depth representation information of each group is described.

Note that the information processing apparatus according to the first aspect and the information processing apparatus according to the second aspect can be realized by causing a computer to execute a program.

Moreover, in order to realize the information processing apparatus according to the first aspect and the information processing apparatus according to the second aspect, the program to be executed by the computer can be transmitted via a transmission medium or recorded on a recording medium to be provided.

The information processing apparatus according to the first aspect and the information processing apparatus according to the second aspect of the present disclosure may be independent apparatuses or may be internal blocks configuring one apparatus.

Effects of the Invention

According to the first aspect of the present disclosure, the file can be generated. Moreover, according to the first aspect of the present disclosure, it is possible to efficiently describe the depth representation information in the MP4 file.

According to the second aspect of the present disclosure, the file can be reproduced. Moreover, according to the first aspect of the present disclosure, it is possible to reproduce the MP4 file in which the depth representation information is efficiently described.

Note that the effects described herein are not necessarily limited, and any one of the effects described in the present disclosure may be exerted.

BRIEF DESCRIPTION OF THE DRAWINGS

FIG. 3 is a diagram showing the structure of the MP4 file.

FIG. 7 is a diagram showing a detailed structural example of the sgpd box.

FIG. 8 is a diagram showing a first structural example of VisualSampleGroupEntry.

FIG. 9 is a diagram showing the contents of the description in FIG. 8.

FIG. 10 is a diagram showing an example of values of scheme uri in FIG. 9.

FIG. 11 is a diagram showing a first structural example of depth representation information.

FIG. 12 is a diagram showing a second structural example of the depth representation information.

FIG. 13 is a diagram showing an example of values of depth_representation_type in FIG. 11.

FIG. 14 is a diagram showing a detailed structural example of the sbgp box.

FIG. 15 is a diagram showing a second structural example of VisualSampleGroupEntry.

FIG. 16 is a diagram showing the contents of the description in FIG. 15.

FIG. 17 is a diagram showing an example of values of depth_scheme_type.

FIG. 18 is a diagram showing a third structural example of VisualSampleGroupEntry.

FIG. 19 is a diagram showing an example of values of group_type_parameter of the sbgp box.

FIG. 24 is a diagram for explaining an alternative arrangement method of the depth representation information.

FIG. 25 is a diagram showing a structural example of an avcC box in a first alternative arrangement method.

FIG. 26 is a diagram showing a first structural example of the DEPI box in FIG. 25.

FIG. 27 is a diagram showing a second structural example of the DEPI box in FIG. 25.

FIG. 28 is a diagram showing a structural example of VisualSampleEntry in a second alternative arrangement method.

FIG. 29 is a diagram showing a structural example of a DEPI box in a fourth alternative arrangement method.

FIG. 30 is a diagram showing a first structural example of VisualSampleGroupEntry in a second embodiment.

FIG. 31 is a diagram showing a first structural example of an sbgp box in the second embodiment.

FIG. 32 is a diagram for explaining information described in the sbgp box in FIG. 31.

FIG. 34 is a diagram showing a second structural example of VisualSampleGroupEntry in the second embodiment.

FIG. 35 is a diagram showing a second structural example of the sbgp box in the second embodiment.

FIG. 37 is a diagram showing a structural example of the tref box.

FIG. 38 is a diagram showing a structural example of DepthRepresentasionSampleEntry.

FIG. 39 is a diagram showing a first structural example of DepthRepresentationConfigurationBox in FIG. 38.

FIG. 40 is a diagram showing a second structural example of DepthRepresentationConfigurationBox in FIG. 38.

FIG. 43 is a diagram showing an example of a description method of depth representation type in the stsd box.

MODE FOR CARRYING OUT THE INVENTION

Hereinafter, modes for carrying out the present disclosure (hereinafter, referred to as embodiments) will be described. Note that the description will be given in the following order.

1. First Embodiment: Information Processing System (FIGS. 1 to 29)
2. Second Embodiment: Information Processing System (FIGS. 30 to 35)
3. Third Embodiment: Information Processing System (FIGS. 36 to 41)
4. Fourth Embodiment: Information Processing System (FIGS. 42 to 44)
5. Fifth Embodiment: Information Processing System (FIG. 45)
6. Sixth Embodiment: Information Processing System (FIG. 46)
7. Seventh Embodiment: Computer (FIG. 47)

First Embodiment (Configuration Example of Information Processing System According to First Embodiment)

Figure 1:
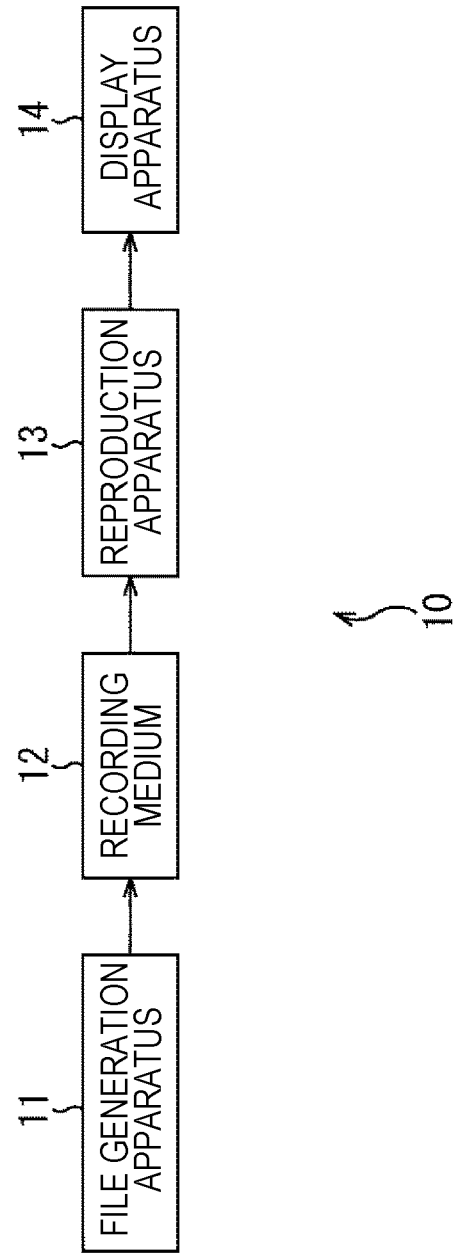
FIG. 1 is a block diagram showing a configuration example of an information processing system according to a first embodiment, to which the present disclosure is applied.

FIG. 1 is a block diagram showing a configuration example of an information processing system according to a first embodiment, to which the present disclosure is applied.

An information processing system 10 in FIG. 1 is configured with a file generation apparatus 11, a recording medium 12, a reproduction apparatus 13 and a display apparatus 14. The information processing system 10 generates an MP4 file which stores an elementary stream encoded by the MVD method or the MV-HEVC method and depth representation information, records the MP4 file on the recording medium 12 and reproduces the MP4 file.

Specifically, the file generation apparatus 11 of the information processing system 10 quantizes depth information of each pixel into values from 0 to 255 by using predetermined units of regions of a texture image of the moving picture contents as pixels and generates a depth image including the pixel values obtained as a result. The file generation apparatus 11 encodes the texture image and the depth image by the MVD method or the MV-HEVC method and generates the elementary stream. The file generation apparatus 11 samples and arranges the elementary stream as well as groups the samples with the same depth representation information and generates the MP4 file in which depth representation information different from each other among the depth representation information of each group is described. The file generation apparatus 11 supplies the generated MP4 file to the recording medium 12 to be recorded.

The recording medium 12 records the MP4 file supplied from the file generation apparatus 11.

The reproduction apparatus 13 reads out the MP4 file recorded on the recording medium 12. The reproduction apparatus 13 extracts the elementary stream of each sample from the MP4 file and decodes the elementary stream by the MVD method or the MV-HEVC method. The reproduction apparatus 13 also extracts the depth representation information of each group from the MP4 file. The reproduction apparatus 13 generates depth information from the depth image on the basis of the depth representation information of the groups corresponding to the depth image obtained as a result of the decoding. The reproduction apparatus 13 generates a three-dimensional image which realizes stereoscopic vision on the basis of the texture image obtained as a result of the decoding and the depth information and supplies the three-dimensional image to the display apparatus 14.

The display apparatus 14 displays the three-dimensional image supplied from the reproduction apparatus 13.

(Configuration Example of File Generation Apparatus)

Figure 2:
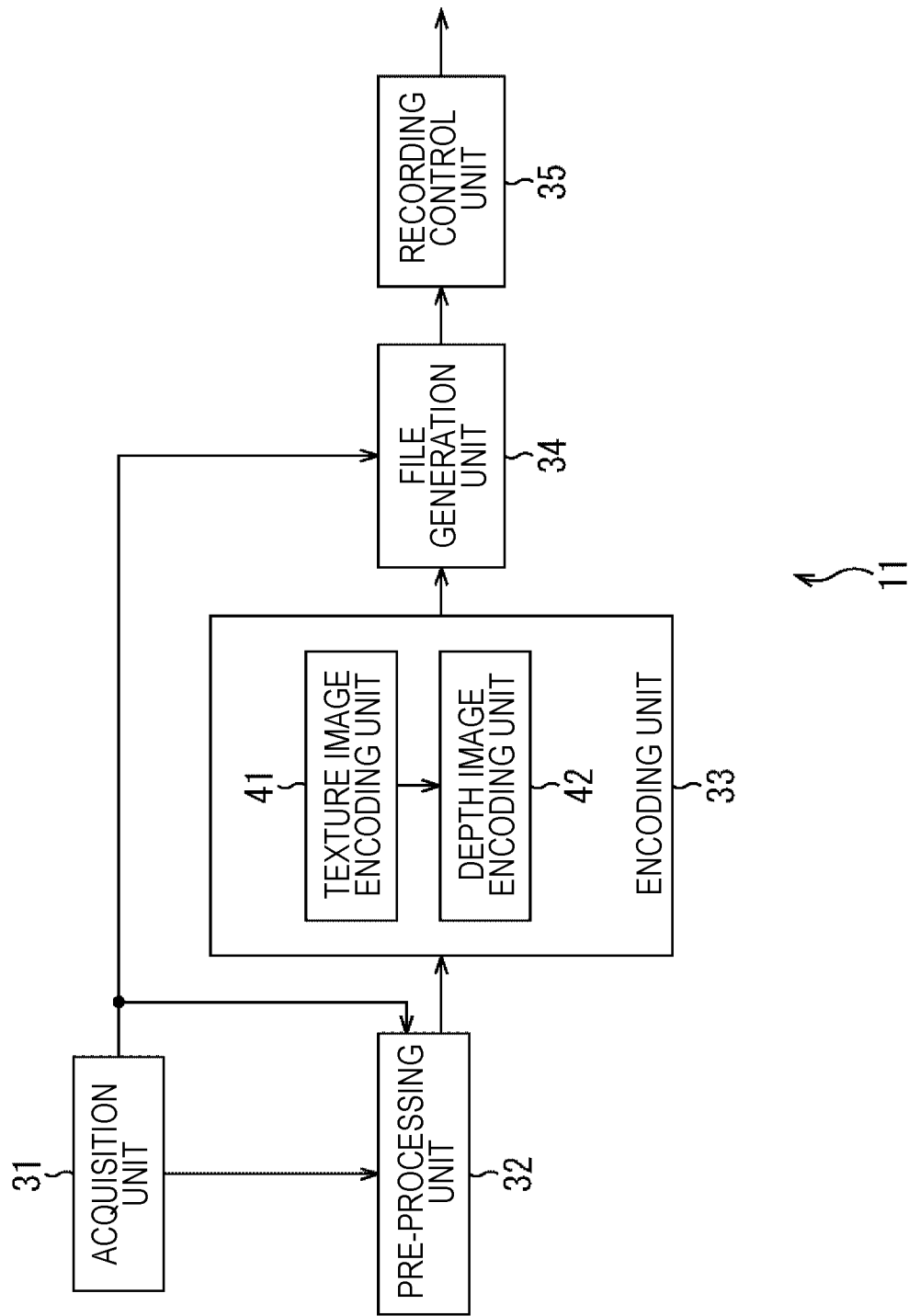
FIG. 2 is a block diagram showing a configuration example of the file generation apparatus in FIG. 1.

FIG. 2 is a block diagram showing a configuration example of the file generation apparatus 11 in FIG. 1.

The file generation apparatus 11 in FIG. 2 is configured with an acquisition unit 31, a pre-processing unit 32, an encoding unit 33, a file generation unit 34 and a recording control unit 35.

The acquisition unit 31 of the file generation apparatus 11 acquires the texture image of the moving picture contents from the outside and the depth information of each pixel when the predetermined units of regions of the texture image are pixels, and supplies the texture image and the depth information to the pre-processing unit 32. The acquisition unit 31 also acquires the depth representation information from the outside and supplies the depth representation information to the pre-processing unit 32 and the file generation unit 34.

On the basis of the depth representation information supplied from the acquisition unit 31, the pre-processing unit 32 quantizes the depth information of each pixel into a value from 0 to 255 and generates the depth image including the pixel values obtained as a result. The pre-processing unit 32 supplies the depth image, the texture image and the depth representation information to the encoding unit 33.

The encoding unit 33 is configured with a texture image encoding unit 41 and a depth image encoding unit 42. The texture image encoding unit 41 encodes the texture image supplied from the pre-processing unit 32 by the MVD method or the MV-HEVC method. The texture image encoding unit 41 supplies the texture image decoded at the time of encoding to the depth image encoding unit 42.

The depth image encoding unit 42 encodes the depth image supplied from the pre-processing unit 32 by the MVD method or the MV-HEVC method, with the texture image supplied from the texture image encoding unit 41 as a candidate for a reference image.

The encoding unit 33 supplies the elementary stream (encoded stream), which includes the texture image encoded by the texture image encoding unit 41 and the depth image encoded by the depth image encoding unit 42 and includes the depth representation information as SEI, to the file generation unit 34.

The file generation unit 34 samples and arranges the elementary stream supplied from the encoding unit 33 as well as groups consecutive samples with the same depth representation information and generates the MP4 file in which depth representation information different from each other among the depth representation information of each group is described. The file generation unit 34 supplies the MP4 file to the recording control unit 35.

The recording control unit 35 supplies the MP4 file supplied from the file generation unit 34 to the recording medium 12 in FIG. 1 to be recorded.

(Structure of MP4 File)

Figure 3:
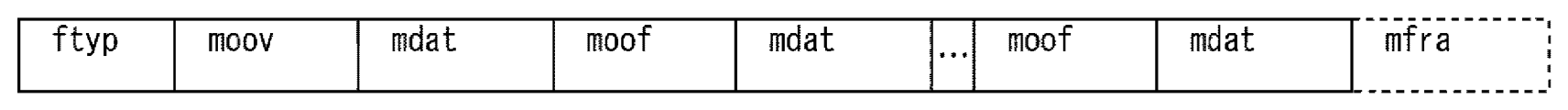

FIG. 3 is a diagram showing the structure of the MP4 file.

As shown in FIG. 3, the structure of the MP4 file is a box structure. In the example in FIG. 3, the MP4 file has a Fragment Movie structure. Therefore, in the MP4 file in FIG. 3, an ftyp box (FileTypeBox), a moov box (MovieBox) and an mdat box (MediaDataBox) as well as one or more moof boxes (MovieFragmentBox) and an mdat box are arranged in order.

The ftyp box is a box indicating the beginning of the MP4 file, and information for identifying the file format and the like are described therein. In the moov box, information regarding samples of all time samples (hereinafter referred to as sample information) and the like are described. In the mdat box, the samples are arranged. In the moof box, the sample information at each any time and the like are described.

Note that an mfra box (MovieFragmentRandomAccess-Box), in which information regarding random access is described may be arranged in the MP4 file as necessary.

(Structure of moov Box)

Figure 4:
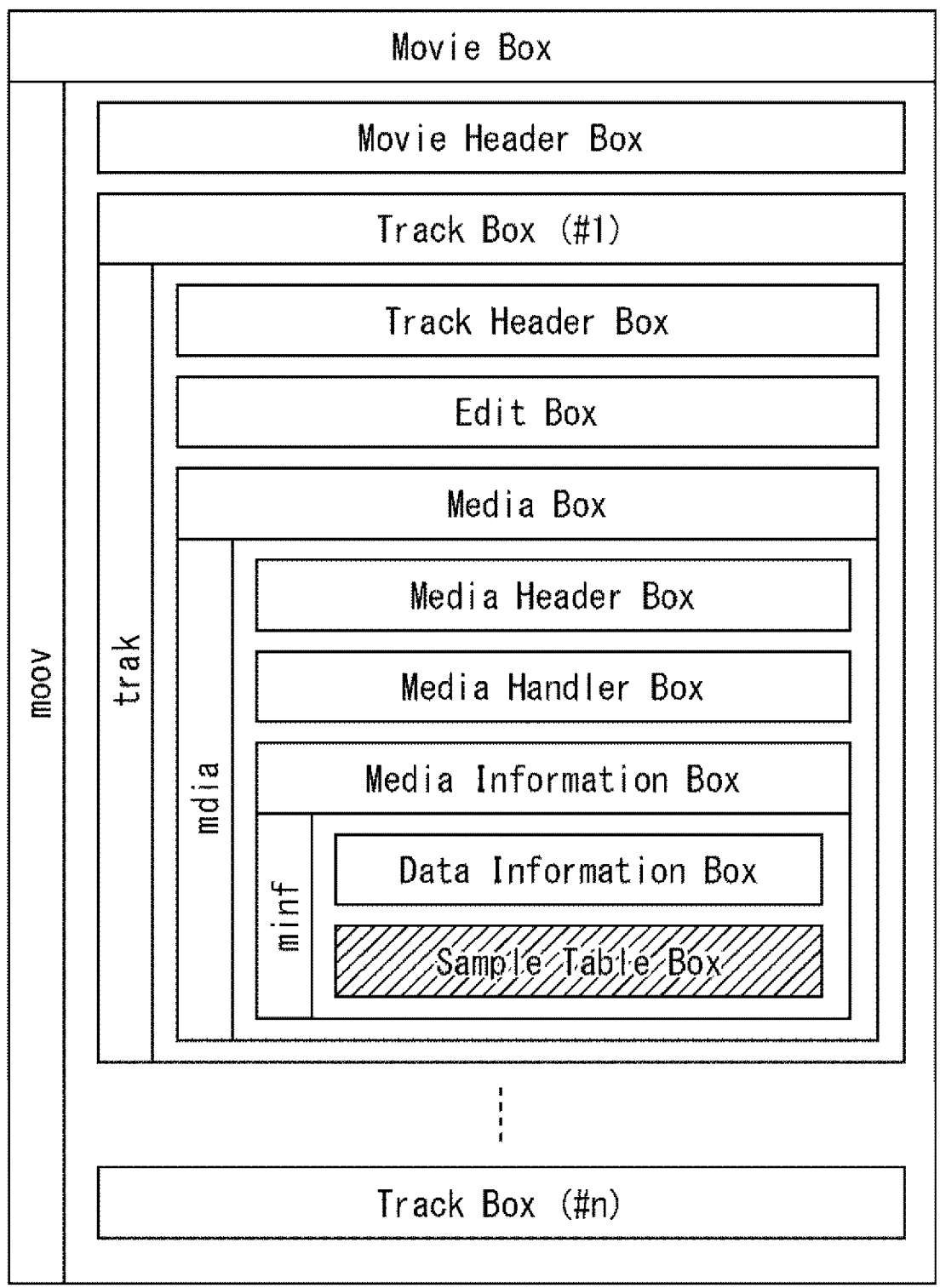
FIG. 4 is a diagram showing the structure of the moov box.

FIG. 4 is a diagram showing the structure of the moov box.

As shown in FIG. 4, the moov box is configured with MovieHeaderBox and one or more trak boxes (TrackBox). In MovieHeaderBox, information designating the time axis of the moving picture contents and the like are described.

The trak boxes are arranged in units of tracks, and information regarding the corresponding track is described therein. For example, in the trak box, an stbl box (SampleTableBox), in which the sample information on all time samples to which a corresponding track is allocated is described, is arranged.

In the stbl box, a technique called a sample group is used. The technique called the sample group is a technique of grouping consecutive samples with common sample information and describing only sample information different from each other among the sample information of each group. With this technique, it is possible to prevent the same sample information from being redundantly described. Therefore, in a case where sample information on a plurality of samples is the same, the sample information can be efficiently described.

(Structure of moof Box)

Figure 5:
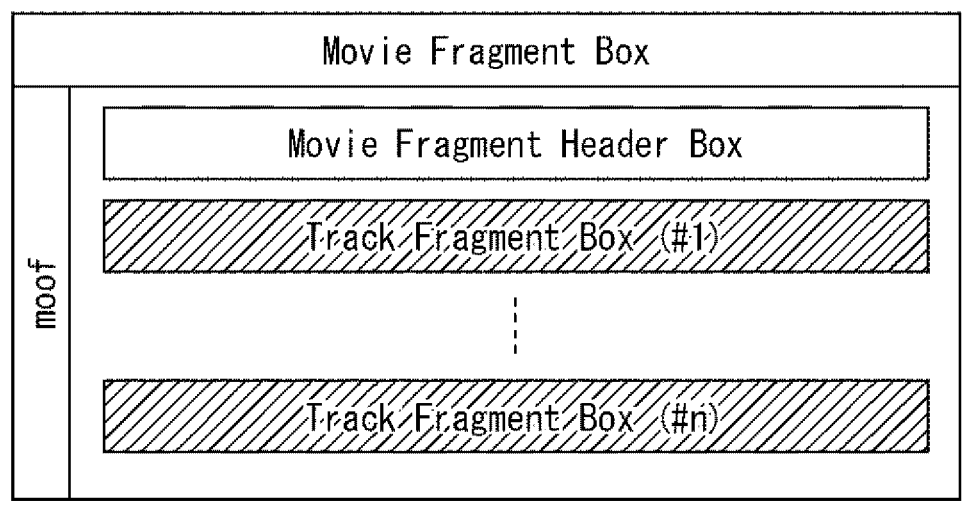
FIG. 5 is a diagram showing the structure of the moof box.

FIG. 5 is a diagram showing the structure of the moof box.

As shown in FIG. 5, the moof box is configured with MovieFragmentHeaderBox and one or more traf boxes (TrackFragmentBox). In MovieFragmentHeaderBox, sequence numbers and the like assigned to the moof boxes in order are described.

The traf boxes are arranged in units of tracks, and sample information on samples at any time to which the corresponding tracks are allocated is described in the traf box. Similarly to the stbl box, the technique called the sample group is used in the traf box.

(Explanation of Sample Groups)

Figure 6:
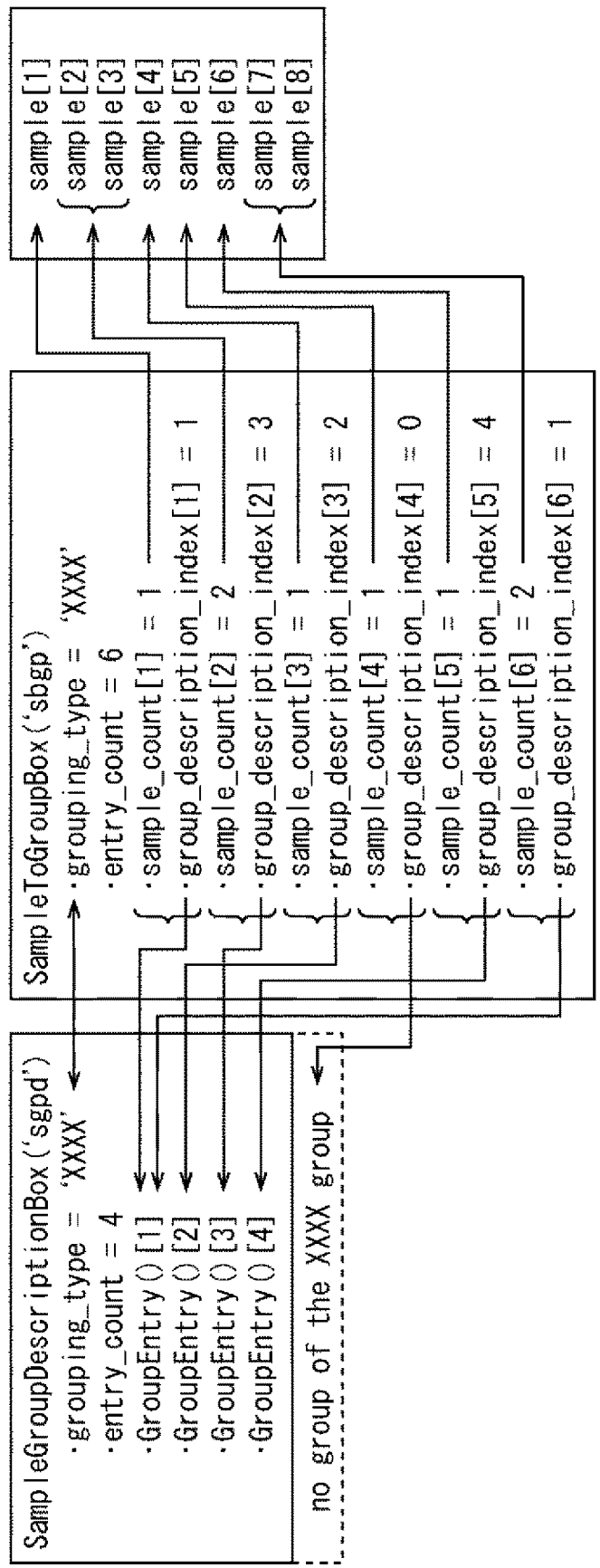
FIG. 6 is a diagram for explaining the sample groups.

FIG. 6 is a diagram for explaining the sample groups.

As shown in FIG. 6, a box using the technique called the sample group includes an sgpd box (SampleGroupDescriptionBox) and an sbgp box (SampleToGroupBox).

The sgpd box is a box which groups the samples with the common sample information and describes the sample information of each group. The sbgp box is a box which describes information for specifying samples of each group (hereinafter referred to as sample specifying information).

In the sgpd box (group information box), grouping_type, entry_count, GroupEntry and the like are described, grouping_type of the sgpd box indicates the type of the sample information which is the base of grouping the corresponding group, and entry_count indicates the number of sample information different from each other among the sample information of each group. In addition, GroupEntry is sample information different from each other among the sample information of each group, and only entry_count is described therein. The structure of GroupEntry is different depending on grouping_type.

In the sbgp box (group box), grouping_type, entry_count, sample_count, group_description_index and the like are described. grouping_type of the sbgp box indicates the type of the sample information which is the base of grouping the corresponding group, and entry_count indicates the number of groups.

sample_count is sample specifying information of each group and indicates the number of consecutive samples of each group. Only entry_count is described in sample_count, and the sum of all sample_count is the number of samples corresponding to the box (e.g., the trak box and the traf box) including the sgpd box (e.g., the total number of samples of the track). group_description_index is information for specifying GroupEntry which is the sample information of each group.

In the example in FIG. 6, entry_count of the sbgp box and the sgpd box with the same grouping_type are 6 and 4, respectively. Therefore, the number of groups is six, and the number of the sample information different from each other among the sample information of the six groups is four. Then, four GroupEntry are described in the sgpd box.

Moreover, the first to sixth sample_count [1] to sample_count [6] from the beginning of the sbgp box are 1, 2, 1, 1, 1, 2 in order. Therefore, the number of samples in the first to sixth groups from the beginning are 1, 2, 1, 1, 1, 2 in order.

That is, the first sample from the beginning (sample [1]) is classified into the first group from the beginning, and the second and third samples from the beginning (sample [2] and sample [3]) are classified into the second group from the beginning. In addition, the fourth sample from the beginning (sample [4]) is classified into the third group from the beginning, and the fifth sample from the beginning (sample [5]) is classified into the fourth group from the beginning. The sixth sample from the beginning (sample [6]) is classified into the fifth group from the beginning, and the seventh and eighth samples from the beginning (sample [7] and sample [8]) are classified into the sixth group from the beginning.

Furthermore, the first to sixth group_description_index [1] to group_description_index [6] from the beginning are 1, 3, 2, 0, 4, 1 in order. Therefore, the sample information on the first sample from the beginning classified into the first group from the beginning is the first GroupEntry from the beginning. In addition, the sample information common to the second and third samples from the beginning classified into the second group from the beginning is the third GroupEntry from the beginning.

Furthermore, the sample information on the fourth sample from the beginning classified into the third group from the beginning is the second GroupEntry from the beginning. In addition, there is no fourth sample information from the beginning classified into the fifth group from the beginning.

In addition, the sample information on the sixth sample from the beginning classified into the fifth group from the beginning is the fourth GroupEntry from the beginning. In addition, the sample information common to the seventh and eighth samples from the beginning classified into the sixth group from the beginning is the first GroupEntry from the beginning.

(Detailed Structural Example of sgpd Box)

FIG. 7 is a diagram showing a detailed structural example of the sgpd box.

As shown in FIG. 7, grouping_type and entry_count are described in the sgpd box. In addition, in the sgpd box corresponding to a track of the moving picture, VisualSampleGroupEntry, which is sample information of the track of the moving picture, is described as GroupEntry. The structure of VisualSampleGroupEntry is different depending on grouping_type.

(First Structural Example of VisualSampleGroupEntry)

FIG. 8 is a diagram showing a first structural example of VisualSampleGroupEntry in a case where grouping_type is DEPI indicating that the sample information, which is the base of the grouping, is the depth representation information.

VisualSampleGroupEntry in FIG. 8 includes scheme_uri, length and depth_representation_information.

As shown in FIG. 9, scheme_uri in FIG. 8 is information indicating the structure of the depth representation information. length is information indicating the length of the depth representation. depth_representation_information is the depth representation information as the sample information.

(Example of Values of Scheme uri)

FIG. 10 is a diagram showing an example of values of scheme_uri in FIG. 9.

As shown in FIG. 10, for example, there are urn:mpeg:14496:10:depth_representation_information:2015 and urn:mpeg:23008:2:depth_representation information:2015 as values of scheme uri.

urn:mpeg:14496:10:depth_representation_information:2015 is a value indicating that the structure of the depth representation information is the same as the structure of the depth representation information SEI message of ISO/IEC 14496-10.

In addition, urn:mpeg:23008:2:depth_representation_information:2015 is a value indicating that the structure of the depth representation information is the same as the structure of the depth representation information SEI message of ISO/IEC 23008-2.

As described above, in the case where the information indicating the structure of the depth representation information is described as scheme_uri, it is possible to indicate structure other than the structure defined at present only by setting the value of scheme_uri. Therefore, it is possible to easily expand the structure of the depth representation information.

(Structural Example of Depth Representation Information)

FIG. 11 is a diagram showing a structural example of the depth representation information in the case where the structure of the depth representation information is the same as the structure of the depth representation information SEI message of ISO/IEC 14496-10.

The depth representation information in FIG. 11 includes depth_representation_type indicating the type of the depth image and information representing the minimum value and the maximum value of the depth information. The information representing the minimum value and the maximum value of the depth information in FIG. 11 is ZNearSign, ZNearExp, ZNearMantissa and ZNearManLen (DMinSign, DMinExp, DMinMantissa and DMinManLen) representing the minimum value of the depth information, ZFarSign, ZFarExp, ZFarMantissa and ZFarManLen (DMaxSign, DMaxExp, DMaxMantissa and DMaxManLen) representing the maximum value, or common_z_axis_reference_view and z_axis_reference_view (disparity_reference_view) which are information specifying the depth image before the minimum value and the maximum value of the depth information are the same.

FIG. 12 is a diagram showing a structural example of the depth representation information in the case where the structure of the depth representation information is the same as the structure of the depth representation information SEI message of ISO/IEC 23008-2.

The depth representation information in FIG. 12 includes depth_representation_type indicating the type of the depth image and information representing the minimum value and the maximum value of the depth information. The information representing the minimum value and the maximum value of the depth information in FIG. 12 is ZNearSign, ZNearExp, ZNearMantissa and ZNearManLen (DMinSign, DMinExp, DMinMantissa and DMinManLen) representing the minimum value of the depth information, ZFarSign, ZFarExp, ZFarMantissa and ZFarManLen (DMaxSign, DMaxExp, DMaxMantissa and DMaxManLen) representing the maximum value, or disparity_ref_view_id which is information specifying the depth image before the minimum value and the maximum value of the depth information are the same in a case where the depth information is information representing disparity.

As shown in FIGS. 11 and 12, the structure of the depth representation information is different between the case where the structure of the depth representation information is the same as the structure of the depth representation information SEI message of ISO/IEC 14496-10 and the case where the structure of the depth representation information is the same as the structure of the depth representation information SEI message of ISO/IEC 23008-2.

(Example of Values of depth_representation_type)

FIG. 13 is a diagram showing an example of values of depth_representation_type in FIG. 11.

As shown in FIG. 13, in a case where the value of depth_representation_type in FIG. 11 is 0, depth_representation_type indicates that the depth image is an image with pixel values which are values obtained by uniformly quantizing the depth information, which is the inverse of a depth z representing the position of the subject in the depth direction, into values from 0 to 255.

In addition, in a case where the value of depth_representation_type is 1, depth_representation_type indicates that the depth image is an image with pixel values which are values obtained by uniformly quantizing the depth information, which is the disparity, into values from 0 to 255. Note that the disparity can be uniquely converted into the depth z representing the position of the subject in the depth direction. Therefore, it can be said that the disparity is the depth information representing the subject in the depth direction.

In a case where the value of depth_representation_type is 2, depth_representation_type indicates that the depth image is an image with pixel values which are values obtained by uniformly quantizing the depth information, which is the depth z, into values from 0 to 255.

In a case where the value of depth_representation_type is 3, depth_representation_type indicates that the depth image is an image with pixel values which are values obtained by quantizing the depth information, which is the disparity, into values from 0 to 255 by using a nonlinear function.

(Detailed Structural Example of sbgp Box)

FIG. 14 is a diagram showing a detailed structural example of the sbgp box.

As shown in FIG. 14, the sbgp box includes grouping_type, grouping_type_parameter which is the parameter of the sample information indicated by grouping_type, entry_count, sample_count and group_description_index.

(Second Structural Example of VisualSampleGroupEntry)

FIG. 15 is a diagram showing a second structural example of VisualSampleGroupEntry in a case where grouping_type is DEPI.

The structure of VisualSampleGroupEntry in FIG. 15 is different from the structure in FIG. 8 in that the information indicating the structure of the depth representation information is described as a field instead of scheme_uri.

Specifically, in VisualSampleGroupEntry in FIG. 15, depth_scheme_type is described as a field instead of scheme_uri. As shown in FIG. 16, depth_scheme_type is information indicating the structure of the depth representation information and is information of a fixed length of 16 bits.

(Example of Values of depth_scheme_type)

FIG. 17 is a diagram showing an example of values of depth_scheme_type.

As shown in FIG. 17, in a case where the value of depth_scheme_type is 0x0000, depth_scheme_type indicates that the structure of the depth representation information is the same as the structure of the depth representation information SEI message of ISO/IEC 14496-10.

In addition, in a case where the value of depth_scheme_type is 0x0001, depth_scheme_type indicates that the structure of the depth representation information is the same as the structure of depth representation information SEI message of ISO/IEC 23008-2.

Moreover, in depth_scheme_type, 0x0100 to 0xFFFF are allocated as values indicating structures other than the structure defined at present. Therefore, by only setting any one of the values of 0x0100 to 0xFFFF to depth_scheme_type, it is possible to indicate that the structure is other than the structure defined at present. Accordingly, it is possible to easily expand the structure of the depth_representation_information.

(Third Structural Example of VisualSampleGroupEntry)

FIG. 18 is a diagram showing a third structural example of VisualSampleGroupEntry in a case where grouping_type is DEPI.

The structure of VisualSampleGroupEntry in FIG. 18 is different from the structure in FIG. 8 in that the information indicating the structure of the depth representation information is not described. Specifically, VisualSampleGroupEntry in FIG. 18 includes scheme_uri and length.

(Example of Values of group_type_parameter)

FIG. 19 is a diagram showing an example of values of group_type_parameter of the sbgp box in a case where the structure of VisualSampleGroupEntry is the structure in FIG. 18.

In a case where the structure of the VisualSampleGroupEntry is the structure in FIG. 18, the structure of the depth representation information is described by using group_type_parameter of the sbgp box as shown in FIG. 19. That is, group_type_parameter is described in the sbgp box as information indicating the structure of the depth representation information.

Specifically, in a case where the value of group_type_parameter is 0x0000, group_type_parameter indicates that the structure of the depth representation information is the same as the structure of the depth representation information SEI message of ISO/IEC 14496-10.

In addition, in a case where the value of group_type_parameter is 0x0001, group_type_parameter indicates that the structure of the depth representation information is the same as the structure of the depth representation information SEI message of ISO/IEC 23008-2.

Moreover, in group_type_parameter, 0x0100 to 0xFFFF are allocated as values indicating structures other than the structure defined at present. Therefore, by only setting any one of the values of 0x0100 to 0xFFFF to group_type_parameter, it is possible to indicate that the structure is other than the structure defined at present. Accordingly, it is possible to easily expand the structure of the depth_representation_information.

(Explanation of Processing of File Generation Apparatus)

Figure 20:
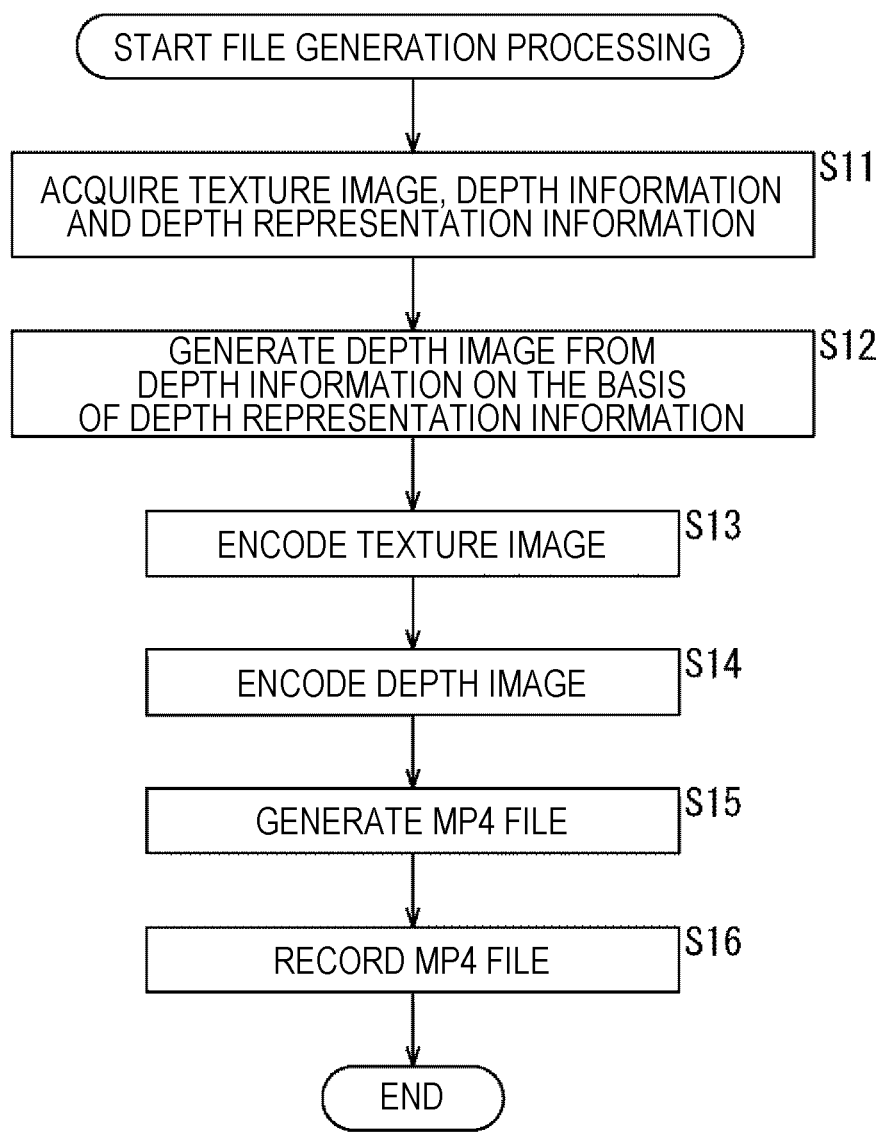
FIG. 20 is a flowchart for explaining the file generation processing of the file generation apparatus.

FIG. 20 is a flowchart for explaining the file generation processing of the file generation apparatus 11 in FIG. 2.

In Step S11 in FIG. 20, the acquisition unit 31 of the file generation apparatus 11 acquires the texture image of the moving picture contents from the outside, the depth information on each pixel and the depth representation information. The acquisition unit 31 supplies the texture image and the depth information on each pixel to the pre-processing unit 32 and supplies the depth representation information to the pre-processing unit 32 and the file generation unit 34.

In Step S12, the pre-processing unit 32 quantizes the depth information on each pixel into a value from 0 to 255 on the basis of the depth representation information and sets the values as the pixel values of the depth image to generate the depth image from the depth information. The pre-processing unit 32 supplies the depth image, the texture image and the depth representation information to the encoding unit 33.

In Step S13, the texture image encoding unit 41 of the encoding unit 33 encodes the texture image supplied from the pre-processing unit 32 by the MVD method or the MV-HEVC method. The texture image encoding unit 41 supplies the texture image decoded at the time of encoding to the depth image encoding unit 42.

In Step S14, the depth image encoding unit 42 encodes the depth image supplied from the pre-processing unit 32 by the MVD method or the MV-HEVC method, with the texture image supplied from the texture image encoding unit 41 as a candidate for a reference image. The encoding unit 33 supplies the elementary stream, which includes the texture image encoded by the texture image encoding unit 41, the depth image encoded by the depth image encoding unit 42, and the depth representation information, to the file generation unit 34.

In Step S15, the file generation unit 34 samples and arranges the elementary streams as well as generates the MP4 file in which the sbgp box and the sgpd box whose grouping_type is DEPI are arranged in the stbl box and the traf box. The file generation unit 34 supplies the MP4 file to the recording control unit 35.

In Step S16, the recording control unit 35 supplies the MP4 file supplied from the file generation unit 34 to the recording medium 12 in FIG. 1 to be recorded. Then, the processing ends.

As described above, the file generation apparatus 11 generates the MP4 file in which the depth representation information is described outside the elementary stream. Therefore, the reproduction apparatus 13 can extract the depth representation information directly from the MP4 file and does not need to extract the elementary stream from the MP4 file and further extract the depth presentation information from the elementary stream. As a result, the processing of the reproduction apparatus 13 is facilitated.

Moreover, the file generation apparatus 11 groups the samples with the same depth representation information and describes only depth representation information different from each other in the MP4 file among the depth representation information of each group. Therefore, it is possible to prevent the same depth representation information from being redundantly described in the MP4 file and to efficiently describe the depth_representation_information. As a result, it is possible to reduce the size of the entire depth representation information in the MP4 file.

(Configuration Example of Reproduction Apparatus)

Figure 21:
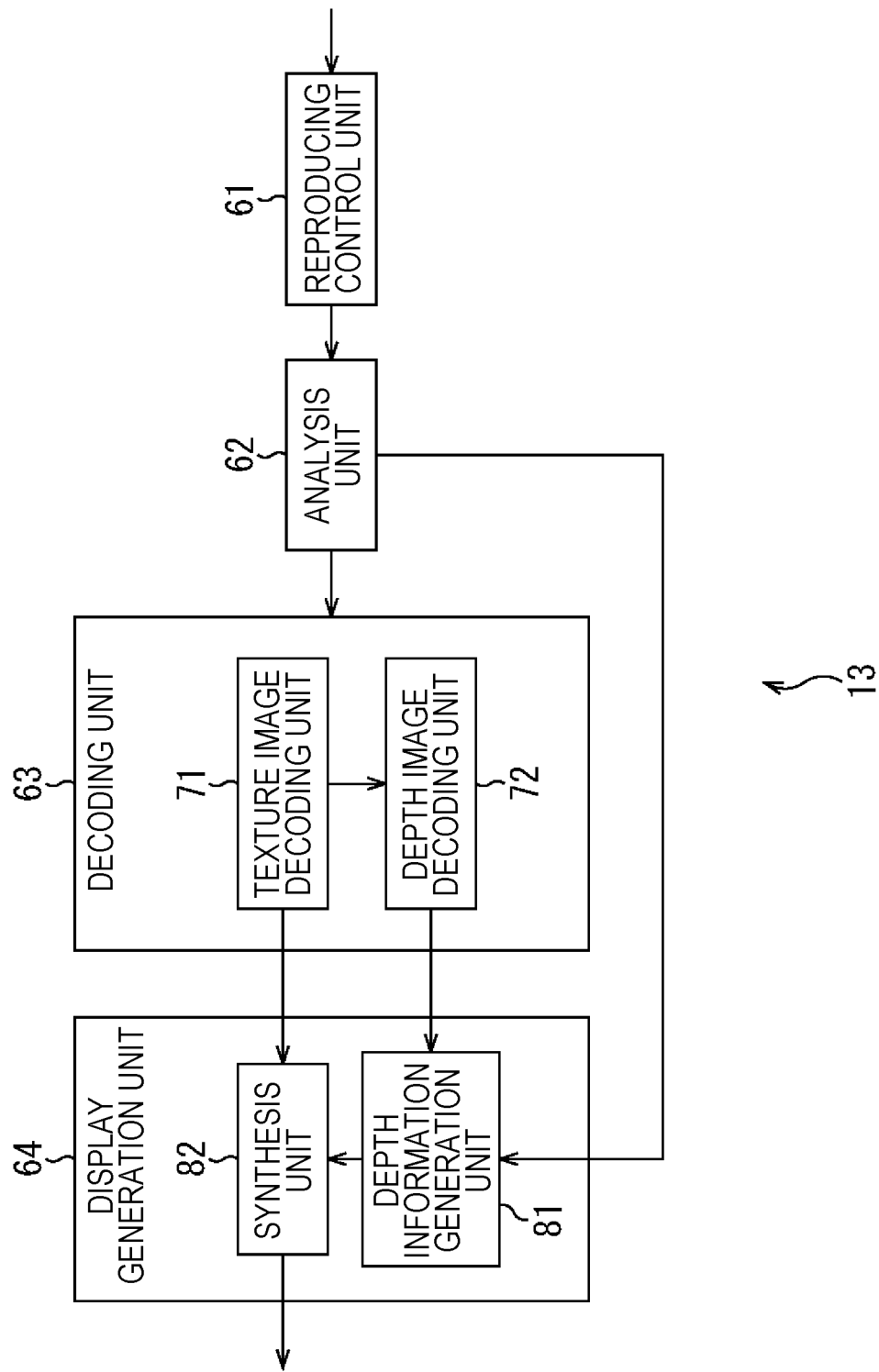
FIG. 21 is a block diagram showing a configuration example of the reproduction apparatus in FIG. 1.

FIG. 21 is a block diagram showing a configuration example of the reproduction apparatus 13 in FIG. 1.

The reproduction apparatus 13 in FIG. 21 is configured with a reproducing control unit 61, an analysis unit 62, a decoding unit 63 and a display generation unit 64.

The reproducing control unit 61 of the reproduction apparatus 13 extracts the current reproducing sample from the MP4 file recorded on the recording medium 12 and supplies the sample to the analysis unit 62. The reproducing control unit 61 also extracts the sbgp box and the sgpd box, whose grouping_type is DEPI, of the track including the current reproducing sample from the MP4 file and supplies the boxes to the analysis unit 62.

The analysis unit 62 supplies the sample supplied from the reproducing control unit 61 to the decoding unit 63. The analysis unit 62 also recognizes the information indicating the structure of the depth representation information on the current reproducing sample and the depth representation information on the basis of the sbgp box and the sgpd box in a case where the current reproducing sample is the elementary stream of the depth image.

Specifically, the analysis unit 62 recognizes the group of the current reproducing sample on the basis of sample_count of the sbgp box. Then, in a case where the structure of the VisualGroupEntry of the sgpd box specified by group_description_index of the group of the current reproducing sample is the structure in FIG. 8, the analysis unit 62 recognizes scheme_uri of VisualGroupEntry as the information indicating the structure of the depth representation information.

On the other hand, in a case where the structure of VisualGroupEntry of the sgpd box specified by group_description_index of the group of the current reproducing sample is the structure in FIG. 15, the analysis unit 62 recognizes depth_scheme_type of VisualGroupEntry as the information indicating the structure of the depth representation information.

In addition, in a case where the structure of VisualGroupEntry of the sgpd box specified by group_description_index of the group of the current reproducing sample is the structure in FIG. 18, the analysis unit 62 recognizes grouping_type_parameter of the sbgp box as the information indicating the structure of the depth representation information.

The analysis unit 62 also recognizes the depth representation information (depth_representation_information) from VisualGroupEntry of the sgpd box specified by group_description_index of the group of the current reproducing sample. The analysis unit 62 supplies the information indicating the structure of the depth representation information and the depth representation information, which have been recognized, to the display generation unit 64.

The decoding unit 63 is configured with a texture image decoding unit 71 and a depth image decoding unit 72. In a case where the current reproducing sample supplied from the analysis unit 62 is the elementary stream of the texture image, the texture image decoding unit 71 of the decoding unit 63 decodes that elementary stream by the MVD method or the MV-HEVC method. The texture image decoding unit 71 supplies the decoded texture image to the display generation unit 64 and the depth image decoding unit 72.

In a case where the current reproducing sample supplied from the analysis unit 62 is the elementary stream of the texture image, the depth image decoding unit 72 decodes that elementary stream by the MVD method or the MV-HEVC method, with the texture image supplied from the texture image decoding unit 71 as a reference image as necessary. The depth image decoding unit 72 supplies the depth image obtained as a result of the decoding to the display generation unit 64.

The display generation unit 64 is configured with a depth information generation unit 81 and a synthesis unit 82. The depth information generation unit 81 of the display generation unit 64 dequantizes the depth image from the depth image decoding unit 72 on the basis of the information indicating the structure of the depth representation information and the depth representation information from the analysis unit 62 and generates the depth information.

Specifically, in a case where the information indicating the structure of the depth representation information is information indicating structure that can be recognized by itself, the depth information generation unit 81 analyzes the structure of the depth representation information and recognizes the type of the depth image and the minimum value and the maximum value of the depth information. The depth information generation unit 81 dequantizes the depth image on the basis of the type of the depth image and the minimum value and the maximum value of the depth information and generates the depth information. Then, the depth information generation unit 81 supplies the depth information and the type of the depth image to the synthesis unit 82.

In a case where the depth information is supplied from the depth information generation unit 81, the synthesis unit 82 generates the 3D image from the texture image and the depth information on the basis of the type of the depth image and supplies the 3D image to the display apparatus 14 in FIG. 1. On the other hand, in a case where the depth information is not supplied from the depth information generation unit 81, the synthesis unit 82 supplies the texture image directly to the display apparatus 14.

(Explanation of Processing of Reproduction Apparatus)

Figure 22:
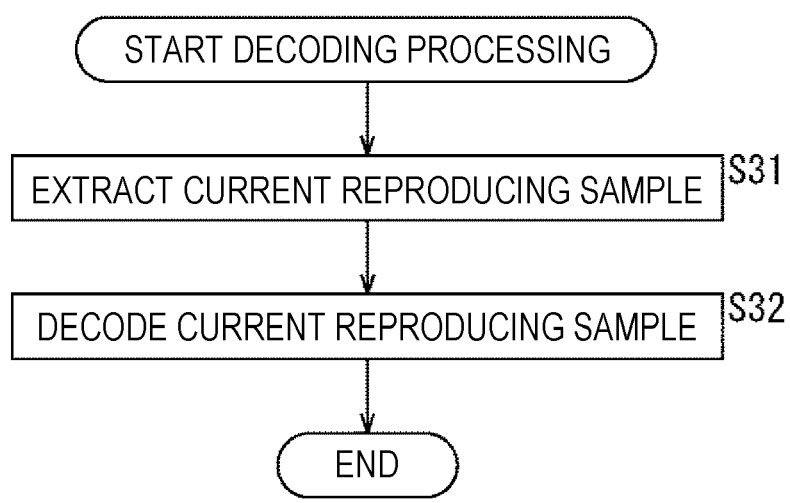
FIG. 22 is a flowchart for explaining the decoding processing of the reproduction apparatus.

FIG. 22 is a flowchart for explaining the decoding processing of the reproduction apparatus 13 in FIG. 21 when the sample, which is the elementary stream of the depth image, is to be currently reproduced.

In Step S31 in FIG. 22, the reproducing control unit 61 extracts the current reproducing sample from the MP4 file recorded on the recording medium 12 and supplies the sample to the decoding unit 63 via the analysis unit 62.

In Step S32, the depth image decoding unit 72 of the decoding unit 63 decodes the current reproducing sample by the MVD method or the MV-HEVC method, with the texture image supplied from the texture image decoding unit 71 as a reference image as necessary. The depth image decoding unit 72 supplies the depth image obtained as a result of the decoding to the depth information generation unit 81, and the processing ends.

Figure 23:
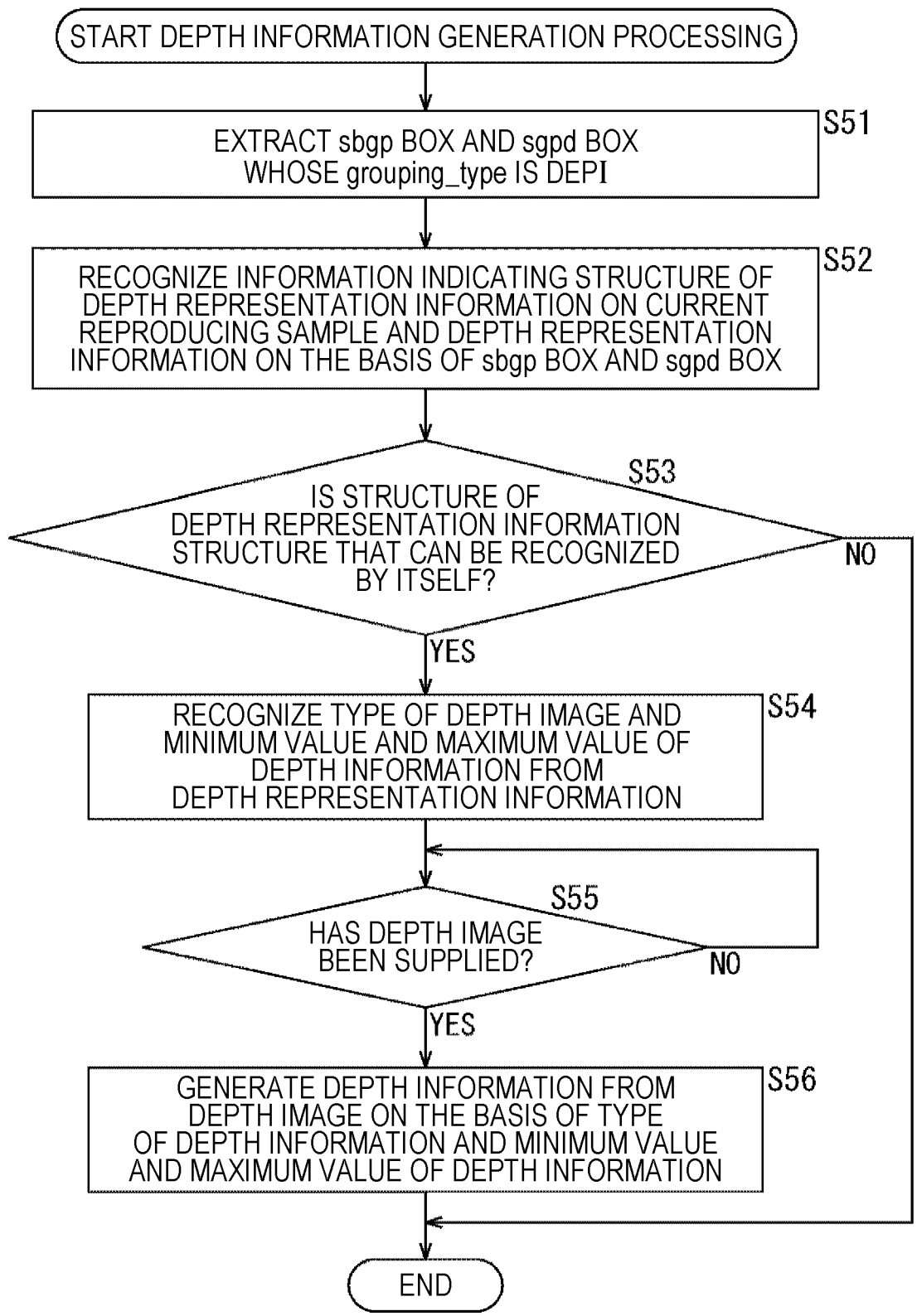
FIG. 23 is a flowchart for explaining the depth information generation processing of the reproduction apparatus.

FIG. 23 is a flowchart for explaining the depth information generation processing of the reproduction apparatus 13 when the sample, which is the elementary stream of the depth image, is to be currently reproduced.

In Step S51 in FIG. 23, the reproducing control unit 61 of the reproduction apparatus 13 extracts the sbgp box and the sgpd box, whose grouping_type is DEPI, of the track including the current reproducing sample from the MP4 file and supplies the boxes to the analysis unit 62.

In Step S52, the analysis unit 62 recognizes the information indicating the structure of the depth representation information on the current reproducing sample and the depth representation information on the basis of the sbgp box and the sgpd box. The analysis unit 62 supplies the information indicating the structure of the depth representation information and the depth representation information, which have been recognized, to the depth information generation unit 81.

In Step S53, the depth information generation unit 81 determines whether or not the structure of the depth representation information from the analysis unit 62 is structure that can be recognized by itself. In a case where the structure of the depth representation information is determined to be the structure that can be recognized by itself in Step S53, the processing proceeds to Step S54.

In Step S54, the depth information generation unit 81 recognizes the type of the depth image and the minimum value and the maximum value of the depth information from the depth representation information.

In Step S55, the depth information generation unit 81 determines whether or not the depth image has been supplied from the depth image decoding unit 72 by the processing in Step S32 in FIG. 22. In a case where the depth image is determined to be not supplied in Step S55, the depth information generation unit 81 waits until the depth image is supplied.

On the other hand, in a case where the depth image is determined to be supplied in Step S55, the depth information generation unit 81 dequantizes the depth image on the basis of the type of the depth image and the minimum value and the maximum value of the depth information and generates the depth information from the depth image in Step S56. Then, the depth information generation unit 81 supplies the depth information and the type of the depth image to the synthesis unit 82.

Meanwhile, in a case where the structure of the depth representation information is determined to be not the structure that can be recognized by itself in Step S53, the processing ends.

Note that the depth information generation unit 81 may determine whether or not the type of the depth image is a type that can be processed by itself after the processing in Step S54 in FIG. 23. In this case, in a case where the type of the depth image is determined to be the type that can be processed by itself, the processing proceeds to Step S55. In a case where the type of the depth image is determined to be not the type that can be processed by itself, the processing ends.

As described above, the reproduction apparatus 13 can reproduce the MP4 file generated by the file generation apparatus 11. The reproduction apparatus 13 can also generate the depth information from the depth image on the basis of the depth presentation information in the MP4 file.

Note that the depth representation information is arranged in the stbl box and the traf box in the above description, but the boxes in which the depth representation information is arranged are not limited to the stbl box and the traf box.

In addition, instead of the MVC method and the MV-HEVC method, the encoding method of the texture image and the depth image may be an AVC method or the HEVC method.

(Explanation of Alternative Arrangement Method of Depth Representation Information)

FIG. 24 is a diagram for explaining an alternative arrangement method of the depth representation information.

More specifically, FIG. 24 is a diagram showing a hierarchical structure of boxes of the MP4 file in a case where the texture image and the depth image are encoded by the AVC method. Closer to the right the box is, the lower the hierarchy is. For example, the trak box is a box of the hierarchy lower than the moov box and is a box arranged in the moov box. In addition, the ftyp box and the moov box are boxes of the same hierarchy.

Moreover, stars in FIG. 24 indicate the positions where the depth representation information is arranged in a case where the depth representation information is arranged outside the entry stream of the MP4 file by the alternative arrangement method.

As shown in FIG. 24, a first alternative arrangement method of the depth representation information is a method of adding a DEPI box (DepthRepresentationInformation-box), which describes the depth_representation_information without using the technique called the sample group, to an avcC box (AVCConfigurationBox) of the lower layer of the trak box. The avcC box is a box in which Config information on the sample encoded by the AVC method is described.

A second alternative arrangement method of the depth representation information is a method of adding the DEPI box to VisualSampleEntry which is the base of SampleEntry of the sample encoded by the AVC method and included in an avc1 box of the lower layer of the trak box.

A third alternative arrangement method of the depth representation information is method of adding the DEPI box to an schi box (SchemeInformationBox) which indicates the contents of post-processing of the lower layer of a rinf box (RestrictedSchemeInformationBox) that describes the information used for the post-processing of the lower layer of the trak box. Since the depth representation information is information used for the depth information generation processing as the post-processing after the decoding processing, convenience can be improved by describing the information in the schi box.

A fourth alternative arrangement method of the depth representation information is a method of adding the DEPI box to a udta box (UserDataBox) of the lower layer of the trak box.

In the first to fourth alternative arrangement methods, since the depth representation information is described outside the elementary stream, the reproduction apparatus 13 does not need to extract the depth representation information from the elementary stream. Therefore, the processing of the reproduction apparatus 13 is facilitated.

Note that the depth representation information is arranged in the moov box in the example in FIG. 24, but may be arranged in the moof box.

(Explanation of First Alternative Arrangement Method)

FIG. 25 is a diagram showing a structural example of the avcC box in the case where the depth representation information is arranged by the first alternative arrangement method.

The avcC box in FIG. 25 includes config information and the DEPI box (DepthRepresentationInformationBox) in units of chunks. The avcC box is newly generated every time the information described in the avcC box differs between the chunks. The avcC box and the chunks are associated by using Sample_description_index which is information for referring to Sample Entry from the SampleToChunkBox in the stbl box.

FIG. 26 is a diagram showing a first structural example of the DEPI box in FIG. 25.

The DEPI box in FIG. 26 includes scheme_uri, length and depth_representation_information. That is, the DEPI box is a box structure of VisualSampleGroupEntry in FIG. 8.

FIG. 27 is a diagram showing a second structural example of the DEPI box in FIG. 25.

The DEPI box in FIG. 27 includes depth_scheme_type, length and depth_representation_information. That is, the DEPI box is a box structure of VisualSampleGroupEntry in FIG. 15.

In the first alternative arrangement method, since the DEPI box is arranged in the avcC box which depends on the encoding method, it is necessary to expand the box, in which the Config information of each encoding method is described, to be capable of arranging the DEPI box.

Note that it is possible to already describe the depth representation information in the box in which the Config information of the HEVC method and the MV-HEVC method is described. However, it is impossible to describe the depth representation information with structure other than the structure defined at present.

On the other hand, in the first alternative arrangement method, by setting scheme_uri or depth_scheme_type to a value indicating structure other than the structure of the depth representation information defined at present, it is possible to describe the depth representation information with that structure.

(Explanation of Second Alternative Arrangement Method)

FIG. 28 is a diagram showing a structural example of VisualSampleEntry in the case where the depth representation information is arranged by the second alternative arrangement method.

In VisualSampleEntry in FIG. 28, the DEPI box is arranged. The structure of this DEPI box is the same as the structure in FIG. 26 or 27. Similarly to the avcC box, a box including SampleEntry of each encoding method having structure based on VisualSampleEntry (avc1 box in a case where the encoding method is the AVC method) is newly generated every time the information described in this box differs between the chunks. This box (e.g., avc1 box) and the chunks are associated by using Sample_description_index which is information for referring to Sample Entry from Sample to Chunk box in the stbl box.

In the second alternative arrangement method, since the DEPI box is arranged in VisualSampleEntry which is the base of the SampleEntry of each encoding method and does not depend on the encoding method, it is unnecessary to expand for each encoding method.

In addition, the structure of the DEPI box arranged in the schi box in the case where the depth representation information is arranged by the third alternative arrangement method is the same as the structure in FIG. 26 or 27. By including the DEPI box, the schi box indicates that the post-processing is the depth information generation processing and indicates the depth representation information necessary for that depth information generation processing.

Similarly to the avcC box, the schi box is newly generated every time the information described in the schi box differs between the chunks. The schi box and the chunks are associated by using Sample_description_index which is information for referring to Sample Entry from SampleToChunkBox in the stbl box.

In the third alternative arrangement method, since the DEPI box is arranged in the schi box which does not depend on the encoding method, it is unnecessary to expand for each encoding method.

As described above, in the first to third alternative arrangement methods, the DEPI box is arranged in the boxes (avcC box, avc1 box, schi box, or the like) generated every time the information described differs between the chunks. Therefore, the file generation unit 34 does not group the samples with the same depth representation information, but describes the depth representation information in the MP4 file for each chunk in which the information described in the box, in which the DEPI box is arranged, differs.

(Explanation of Fourth Alternative Arrangement Method)

FIG. 29 is a diagram showing a structural example of the DEPI box arranged in the udta box in the case where the depth representation information is arranged by the fourth alternative arrangement method.

In the DEPI box in FIG. 29, entry_count and scheme_uri are described, and sample_count, length and depth_representation_information for entry_count are described.

That is, in the fourth alternative arrangement method, the file generation unit 34 groups consecutive samples with the same depth representation information. Then, the file generation unit 34 describes entry_count indicating the number of those groups in the DEPI box.

Moreover, the file generation unit 34 describes sample_count which is sample specifying information of each group, length which indicates the length of the depth representation information, and depth_representation_information which is the depth representation information, in the DEPI box. Furthermore, the file generation unit 34 describes scheme_uri, which indicates the structure of the depth representation information, in the DEPI box. The DEPI box in which the information is described as described above is arranged in the MP4 file.

As described above, in the fourth alternative arrangement method, the samples with the same depth representation information are grouped, and the depth representation information of each group is described in the MP4 file. Therefore, it is possible to suppress the same depth representation information from being redundantly described and to efficiently describe the depth representation information. As a result, it is possible to reduce the size of the entire depth representation information in the MP4 file.

Moreover, in the fourth alternative arrangement method, since the DEPI box is arranged in the udta box which does not depend on the encoding method, it is unnecessary to expand for each encoding method.

Note that the information indicating the structure of the depth representation information is described as scheme_uri in the example in FIG. 29, but may be described as a field as in the case of FIG. 15.

Second Embodiment (First Structural Example of VisualSampleGroupEntry)

The configuration of an information processing system according to a second embodiment, to which the present disclosure is applied, is the same as the configuration in FIG. 1, except that the structure itself of the depth representation information described in the MP4 file is the structure of an NAL unit of the SEI of the depth representation information included in the elementary stream of the depth image.

That is, in the second embodiment, the structure itself of the depth representation information described in VisualSampleGroupEntry is the structure of the NAL unit of the SEI (Depth Representation Information SEI message) including the depth representation information of the elementary stream of the depth image. Therefore, in the second embodiment, VisualSampleGroupEntry, which directly stores the NAL unit defined by ISO/IEC 14496-10 or ISO/IEC 23008-2, is defined.

FIG. 30 is a diagram showing a structural example of such VisualSampleGroupEntry.

grouping_type of VisualSampleGroupEntry in FIG. 30 is nalg indicating that the sample information, which is the base of the grouping, is the NAL unit. In addition, VisualSampleGroupEntry in FIG. 30 includes the NAL unit (NAL unit) defined by ISO/IEC 14496-10 or ISO/IEC 23008-2.

In the second embodiment, VisualSampleGroupEntry in FIG. 30, which includes the NAL unit of the SEI of the depth representation information of the elementary stream of the depth image is described in the sgpd box.

Moreover, in the second embodiment, the sbgp box, whose grouping_type is nalg and which corresponds to the sgpd box in which VisualSampleGroupEntry in FIG. 30 is described, is defined.

(First Structural Example of sbgp Box)

FIG. 31 is a diagram showing a structural example of the sbgp box whose grouping_type is nalg.

The structure in FIG. 31 is the same as the structure in FIG. 14, except that nalg is described as grouping_type and that grouping_type_parameter is replaced with a free region (reserved), NAL_unit_type and NAL_unit_type_information.

As shown in FIG. 32, NAL_unit_type is information representing the type of the NAL unit indicated by grouping_type "nalg" as the sample information and, for example, similarly defined as NAL_unit_type defined by ISO/IEC 14496-10 or ISO/IEC 23008-2.

In addition, NAL_unit_type_information is information which identifies the NAL unit indicated by grouping_type "nalg" as the sample information in the NAL unit of the type represented by NAL_unit_type. For example, in a case where the type of the NAL unit is the type of the NAL unit of the SEI, there are a plurality of types of SEI that can be stored in the NAL unit. Therefore, in such a case, NAL_unit_type_information is described in order to identify the type of SEI stored in the NAL unit indicated by grouping_type "nalg" as the sample information from the type of the SEI that can be stored in the NAL unit.

As described above, by describing NAL_unit_type and NAL_unit_type_information in the sbgp box, the reproduction apparatus 13 can recognize the type of the NAL unit as the sample information used to group the samples. Thus, samples can be grouped on the basis of the NAL unit of any type of the sample information.

In the second embodiment, in a case where the encoding method of the texture image and the depth image is the MVD method, 6 representing the type of the NAL unit of the SEI is described as NAL_unit_type. Then, 50, which is payloadType of the SEI including the depth representation information, is described as NAL_unit_type_information.

Moreover, in a case where the encoding method of the texture image and the depth image is the MV-HEVC method, 39 representing the type of NAL unit of PREFIX SEI is described as NAL_unit_type. Then, 177, which is payloadType of the SEI including the depth representation information, is described as NAL_unit_type_information.

(Explanation of Processing of Information Processing System)

The file generation processing of the file generation apparatus 11 in the second embodiment is the same as the file generation processing in FIG. 20, except that the structure itself of the depth representation information described in the MP4 file is the structure of the NAL unit of the SEI of the depth representation information included in the elementary stream of the depth image. In addition, the decoding processing of the reproduction apparatus 13 in the second embodiment is the same as the decoding processing in FIG. 22. Therefore, hereinafter, the depth information generation processing of the reproduction apparatus 13 in the second embodiment will be described when a sample, which is the elementary stream of the depth image, is to be currently reproduced.

Figure 33:
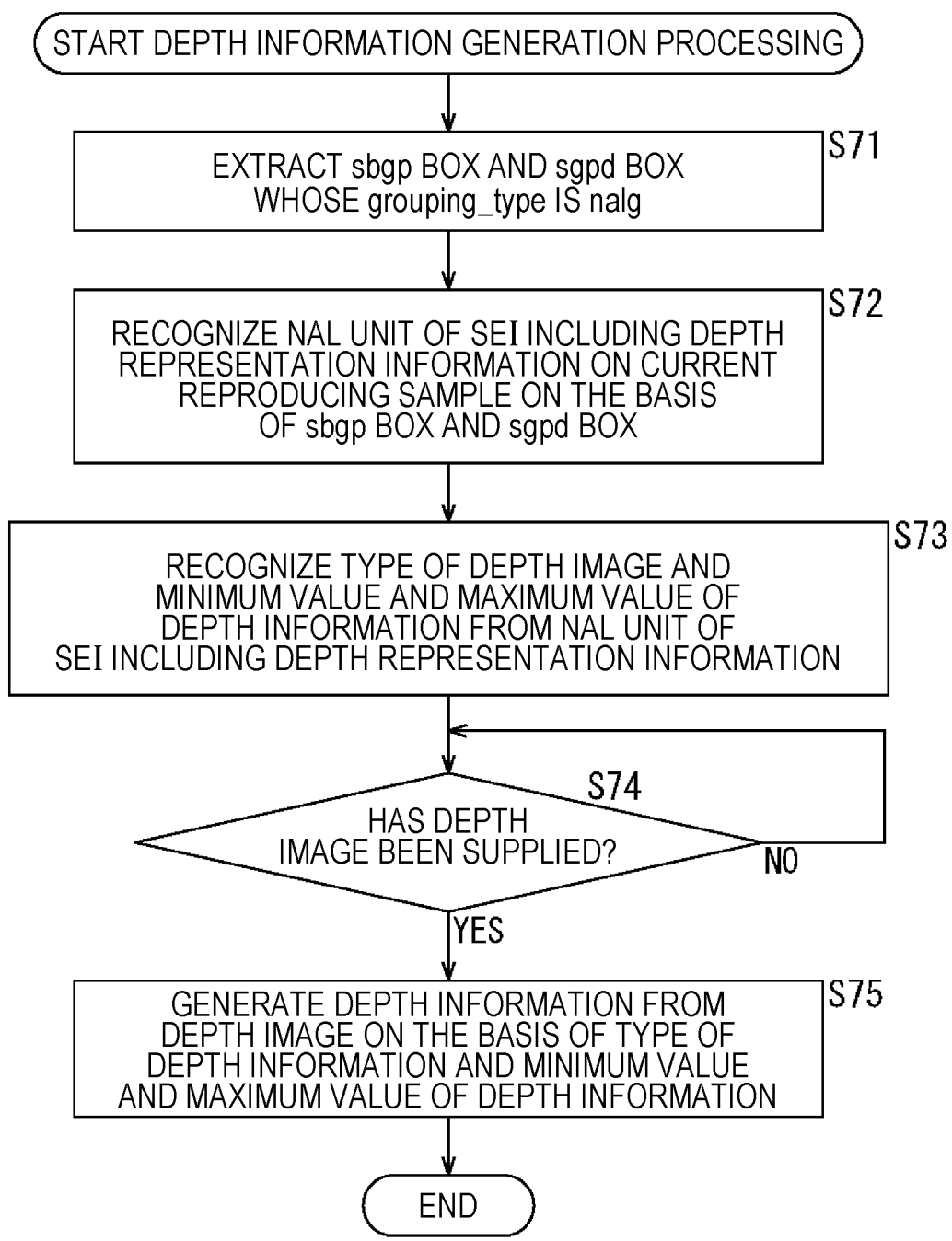
FIG. 33 is a flowchart for explaining the depth information generation processing in the second embodiment.

FIG. 33 is a flowchart for explaining that depth information generation processing.

In Step S71 in FIG. 33, the reproducing control unit 61 of the reproduction apparatus 13 extracts the sbgp box and the sgpd box, whose grouping_type is nalg, of the track including the current reproducing sample from the MP4 file and supplies the boxes to the analysis unit 62.

In Step S72, the analysis unit 62 recognizes the NAL unit of the SEI including the depth representation information on the current reproducing sample on the basis of the sbgp box and the sgpd box. Specifically, the analysis unit 62 selects the sbgp box of the NAL unit of the SEI including the depth representation information on the basis of NAL_unit_type and NAL_unit_type_information of the sbgp box in FIG. 31. The analysis unit 62 recognizes the group of the current reproducing sample on the basis of sample_count of the selected sbgp box. Then, the analysis unit 62 recognizes the NAL unit from VisualGroupEntry in FIG. 30 included in the sgpd box specified by group_description_index of that group. The analysis unit 62 supplies the recognized NAL unit of the SEI of the depth representation information to the depth information generation unit 81.

In Step S73, the depth information generation unit 81 recognizes the type of the depth image and the minimum value and the maximum value of the depth information from the NAL unit of the SEI (FIG. 11 or 12) including the depth representation information supplied from the analysis unit 62.

Since the processing in Steps S74 and S75 are similar to the processing in Steps S55 and S56 in FIG. 23, the descriptions thereof will be omitted.

Note that the depth information generation unit 81 may determine whether or not the type of the depth image is a type that can be processed by itself after the processing in Step S73 in FIG. 33. In this case, in a case where the type of the depth image is determined to be the type that can be processed by itself, the processing proceeds to Step S74. In a case where the type of the depth image is determined to be not the type that can be processed by itself, the processing ends.

Moreover, in the second embodiment, the structure itself of the depth representation information described in the MP4 file may be the structure of the SEI of the depth representation information included in the elementary stream of the depth image. In this case, VisualSampleGroupEntry which directly stores the SEI defined by ISO/IEC 14496-10 or ISO/IEC 23008-2 is defined, and the sbgp box corresponding to the sgpd box in which that VisualSampleGroupEntry is described is defined.

(Second Structural Example of VisualSampleGroupEntry)

FIG. 34 is a diagram showing a structural example of VisualSampleGroupEntry which directly stores the SEI defined by ISO/IEC 14496-10 or ISO/IEC 23008-2.

grouping_type of VisualSampleGroupEntry in FIG. 34 is seim indicating that the sample information, which is the base of the grouping, is the SEI. In addition, VisualSampleGroupEntry in FIG. 34 includes the SEI (sei_message) defined by ISO/IEC 14496-10 or ISO/IEC 23008-2.

In the second embodiment, VisualSampleGroupEntry in FIG. 34, which includes the SEI of the depth representation information of the elementary stream of the depth image is described in the sgpd box.

(Second Structural Example of sbgp Box)

FIG. 35 is a diagram showing a detailed structural example of the sbgp box whose grouping_type is seim and which corresponds to the sgpd box in which VisualSampleGroupEntry in FIG. 34 is described.

The structure in FIG. 35 is the same as the structure in FIG. 14, except that seim is described as grouping_type and that grouping_type_parameter is replaced with a free region (reserved) and payloadType.

payloadType is information which identifies the type of the SEI indicated by grouping_type "seim" as the sample information and, for example, similarly defined as payloadType defined by ISO/IEC 14496-10 or ISO/IEC 23008-2.

As described above, by describing payloadType in the sbgp box, the reproduction apparatus 13 can recognize the type of the SEI as the sample information used to group the samples. Therefore, samples can be grouped on the basis of the SEI of any type of the sample information.

In the second embodiment, in case where the encoding method of the texture image and the depth image is the MVD method, 50, which is payloadType of the SEI including the depth representation information, is described as payloadType. Moreover, in a case where the encoding method of the texture image and the depth image is the MV-HEVC method, 177, which is payloadType of the SEI including the depth representation information, is described as payloadType.

The file generation processing in a case where the structure itself of the depth representation information described in the MP4 file is the structure of the SEI of the depth representation information included in the elementary stream of the depth image is similar to the file generation processing in FIG. 20, except that the structure itself of the depth representation described in the MP4 file is the structure of the SEI of the depth representation information included in the elementary stream of the depth image. In addition, the decoding processing is the same as the decoding processing in FIG. 22.

Furthermore, the depth information generation processing when a sample, which is the elementary stream of the depth image, is to be currently reproduced is similar to the depth information generation processing in FIG. 33, except that grouping_type of the extracted sbgp box and sgpd box are seim and that the NAL unit of the SEI of the depth representation information is replaced with the SEI of the depth representation information.

As described above, in the second embodiment, similarly to the first embodiment, the depth representation information is described outside the elementary stream in the MP4 file so that the processing of the reproduction apparatus 13 is facilitated.

In addition, in the second embodiment, similarly to the first embodiment, the samples with the same depth representation information are grouped, and only depth representation information different from each other are described in the MP4 file among the depth representation information of each group. Therefore, it is possible to reduce the size of the entire depth representation information in the MP4 file.

Third Embodiment (Structural Examples of moov Box and mdat Box)

The configuration of an information processing system according to a third embodiment, to which the present disclosure is applied, is the same as the configuration of the information processing system 10 in FIG. 1, except that the depth representation information on each sample of the elementary stream of the depth image is stored in a sample of a track different from the track of the elementary stream of the depth image in the MP4 file.

That is, in the first embodiment, the track of the elementary stream of the depth image and the track of the depth representation information are the same. Specifically, the depth representation information is described as the sample information of the track of the elementary stream of the depth image, and the elementary stream of the depth image is arranged as the sample. On the other hand, in the third embodiment, the track of the elementary stream of the depth image and the track of the depth representation information are different.

Figure 36:
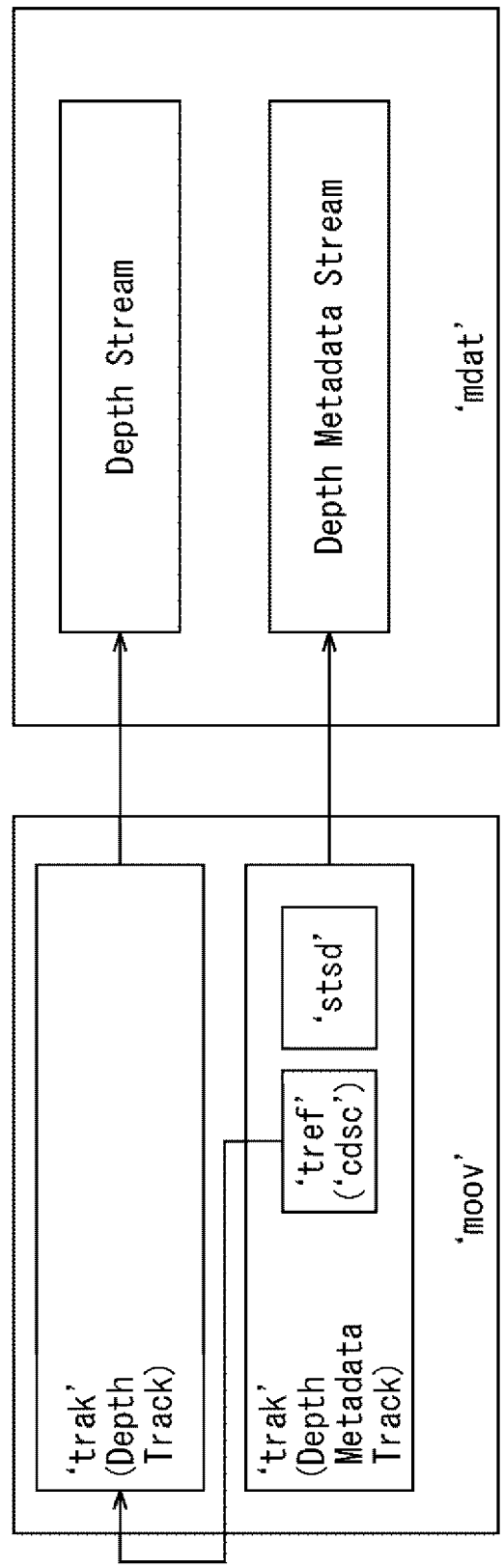
FIG. 36 is a diagram showing structural examples of a moov box and an mdat box in a third embodiment.

FIG. 36 is a diagram showing structural examples of the moov box and the mdat box of the MP4 file in the third embodiment.

Note that only the structures relating to the tracks of the elementary stream of the depth image and the depth representation information are shown in FIG. 36. The same also applies to FIG. 45 described later.

As shown in FIG. 36, in the moov box, a trak box of a track of the elementary stream of the depth image (Depth Track) and a trak box of a track of the depth representation information (Depth Metadata Track) are arranged.

In a tref box (Track Reference Box) of the trak box of the track of the depth representation information, a track ID assigned to the track of the elementary stream of the depth image is described as the track ID for specifying the track to be referred to by that track. In addition, in an stsd box (Sample Description Box), a table of DepthRepresentasionSampleEntry of all samples of the track of the depth representation information is described.

In the mdat box, the elementary stream (Depth Stream) of the depth image is arranged in units of samples as the elementary stream of the track of the elementary stream of the depth image. Also in the mdat box, the depth representation information is sampled and arranged in units of samples as Timed Metadata of the track of the depth representation information. Note that the time for the sample of the track of the depth representation information is time for one or more samples of the track of the elementary stream of the depth image. That is, one or more consecutive samples with the same depth_representation_information in the track of the elementary stream of the depth image are grouped. Then, the depth_representation_information for each group is arranged as a sample of the track of the depth_representation_information at the time for one or more samples configuring each group.

(Structural Example of tref Box)

FIG. 37 is a diagram showing a structural example of the tref box.

As shown in FIG. 37, trackReferenceTypeBox is arranged in the tref box. In trackReferenceTypeBox, reference_type indicating the type of relationship with the track to be referred to is designated, and a track ID (track_IDs) assigned to the track to be referred to is described.

The depth representation information is metadata of the elementary stream of the depth image. Therefore, in the tref box of the track of the depth representation information, "cdsc," which indicates that the relationship with the track to be referred to is the metadata of the track to be referred to, is designated as reference_type. Also in the tref box of the track of the depth representation information, the track ID assigned to the track of the elementary stream of the depth image is described.

(Structural Example of DepthRepresentasionSampleEntry)

FIG. 38 is a diagram showing a structural example of DepthRepresentasionSampleEntry described in the stsd box in FIG. 36.

As shown in FIG. 38, DepthRepresentationConfigurationBox is arranged in DepthRepresentasionSampleEntry.

(First Structural Example of DepthRepresentationConfigurationBox)

FIG. 39 is a diagram showing a first structural example of DepthRepresentationConfigurationBox in FIG. 38.

depth_representation_type in FIG. 13 and sample_structure_type_uri are described in DepthRepresentationConfigurationBox in FIG. 39. sample_structure_type_uri is a value indicating the structure of the depth representation information stored in the sample and, for example, set similarly to the value of scheme_uri in FIG. 10.

(Second Structural Example of DepthRepresentationConfigurationBox)

FIG. 40 is a diagram showing a second structural example of DepthRepresentationConfigurationBox in FIG. 38.

The structure of DepthRepresentationConfigurationBox in FIG. 40 is different from the structure in FIG. 39 in that sample_structure_type is described instead of sample_structure_type_uri.

sample_structure_type is information of a fixed length of 16 bits indicating the structure of the depth representation information and, for example, set similarly to depth_scheme_type in FIG. 17.

(Explanation of Processing of Information Processing System)

The file generation processing of the file generation apparatus 11 in the third embodiment is the same as the file generation processing in FIG. 20, except that the depth representation information on each sample of the elementary stream of the depth image is stored in a sample of a track different from the track of the elementary stream of the depth image in the MP4 file. In addition, the decoding processing of the reproduction apparatus 13 in the third embodiment is the same as the decoding processing in FIG. 22. Therefore, hereinafter, the depth information generation processing of the reproduction apparatus 13 in the third embodiment will be described when a sample, which is the elementary stream of the depth image, is to be currently reproduced.

Figure 41:
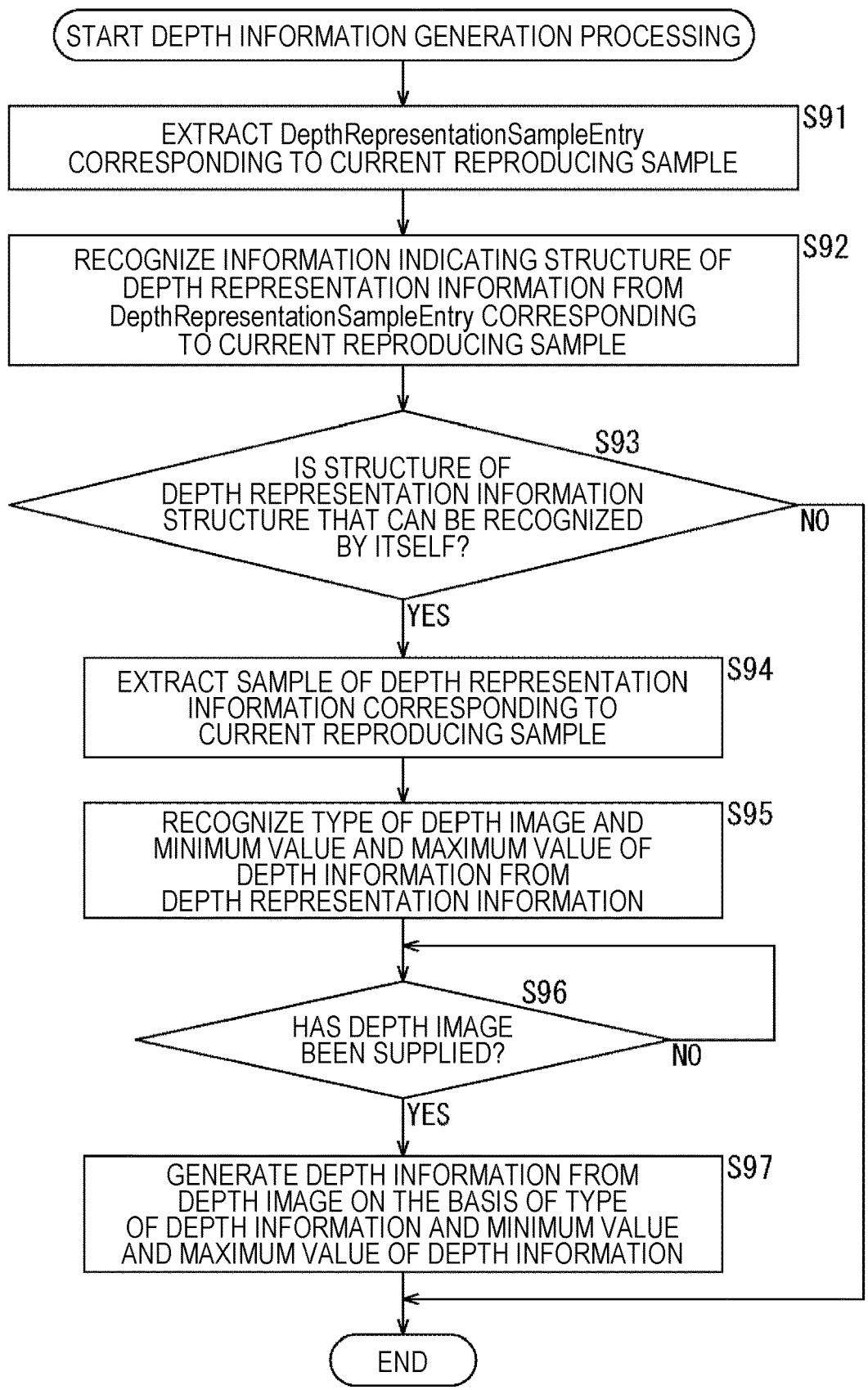
FIG. 41 is a flowchart for explaining the depth information generation processing in a third embodiment.

FIG. 41 is a flowchart for explaining that depth information generation processing.

In Step S91 in FIG. 41, the reproducing control unit 61 of the reproduction apparatus 13 extracts DepthRepresentasionSampleEntry corresponding to the current reproducing sample from the MP4 file. Specifically, the reproducing control unit 61 describes the track ID of the track of the elementary stream of the depth image in the MP4 file and extracts DepthRepresentasionSampleEntry of the sample of the depth representation information corresponding to the current reproducing sample from the stsd box of the trak box including the tref box that designates "cdsc" as reference_type. The reproducing control unit 61 supplies the extracted DepthRepresentasionSampleEntry to the analysis unit 62.

In Step S92, the analysis unit 62 recognizes the information indicating the structure of the depth representation information from DepthRepresentasionSampleEntry corresponding to the current reproducing sample.

Specifically, in a case where the structure of DepthRepresentationConfigurationBox included in DepthRepresentasionSampleEntry is the structure in FIG. 39, the analysis unit 62 recognizes sample_structure_type_uri as the information indicating the structure of the depth representation information. In addition, in a case where the structure of DepthRepresentationConfigurationBox included in DepthRepresentasionSampleEntry is the structure in FIG. 40, the analysis unit 62 recognizes sample_structure_type as the information indicating the structure of the depth representation information. The analysis unit 62 supplies the information indicating the structure of the depth representation information and the depth representation information, which have been recognized, to the depth information generation unit 81.

In Step S93, the depth information generation unit 81 determines whether or not the structure of the depth representation information indicated by the information supplied from the analysis unit 62 is structure that can be recognized by itself. In a case where the structure of the depth representation information is determined to be the structure that can be recognized by itself in Step S93, the processing proceeds to Step S94.

In Step S94, the reproducing control unit 61 extracts the sample of the depth representation information corresponding to the current reproducing sample from the MP4 file and supplies that depth representation information to the depth information generation unit 81 via the analysis unit 62.

Since the processing in Steps S95 to S97 are similar to the processing in Steps S54 to S56 in FIG. 23, the descriptions thereof will be omitted.

On the other hand, in a case where the structure of the depth representation information is determined to be not the structure that can be recognized by itself in Step S93, the processing ends.

Note that the depth information generation unit 81 may determine whether or not the type of the depth image is a type that can be processed by itself after the processing in Step S95 in FIG. 41. In this case, in a case where the type of the depth image is determined to be the type that can be processed by itself, the processing proceeds to Step S96. In a case where the type of the depth image is determined to be not the type that can be processed by itself, the processing ends.

Moreover, in the third embodiment, similarly to the second embodiment, the structure itself of the depth representation information may be the structure of the NAL unit of the SEI or the SEI of the depth representation information included in the elementary stream of the depth image.

As described above, in the third embodiment, similarly to the first embodiment, the depth representation information is described outside the elementary stream in the MP4 file so that the processing of the reproduction apparatus 13 is facilitated. In addition, in the third embodiment, the consecutive samples with the same depth representation information of the tracks of the elementary stream of the depth image are grouped, and the depth representation information of each group is described in the MP4 file. Therefore, it is possible to suppress the same depth representation information from being redundantly described in the MP4 file and to efficiently describe the depth representation information. As a result, it is possible to reduce the size of the entire depth representation information in the MP4 file.

Fourth Embodiment (Structural Examples of moov Box and mdat Box)

The configuration of an information processing system according to a fourth embodiment, to which the present disclosure is applied, is the same as the configuration of the information processing system 10 in FIG. 1, except that depth_representation_type is also arranged in the stsd box.

Figure 42:
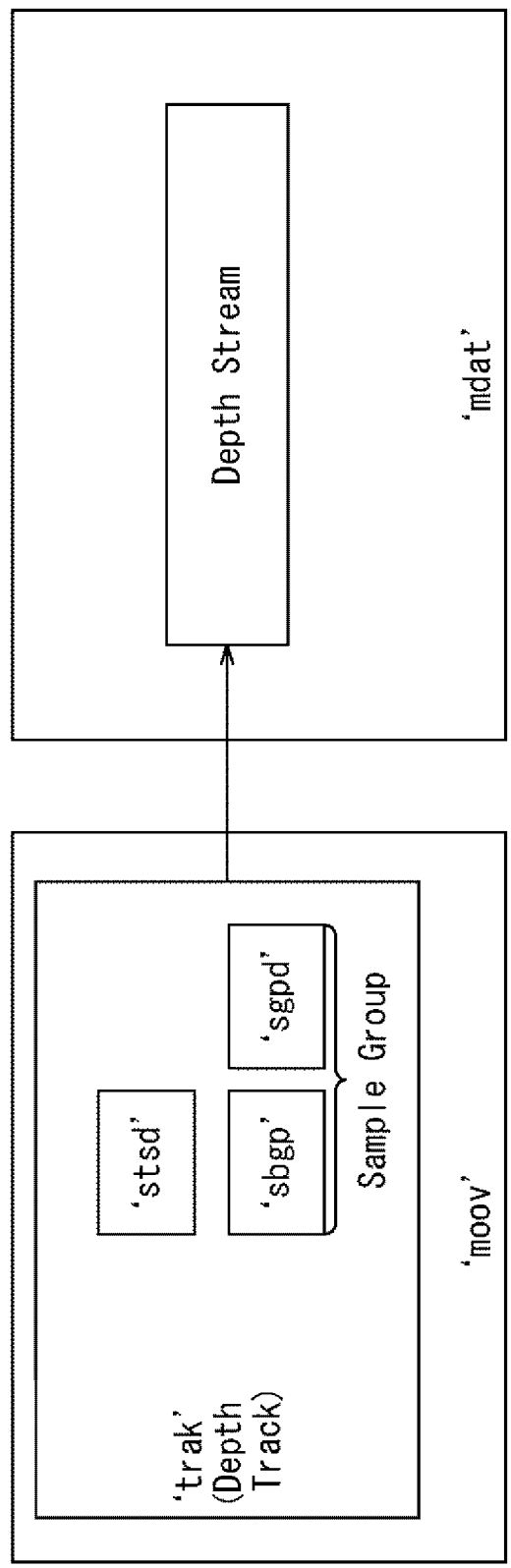
FIG. 42 is a diagram showing structural examples of a moov box and an mdat box in a fourth embodiment.

FIG. 42 is a diagram showing structural examples of the moov box and the mdat box of the MP4 file in the fourth embodiment.

Note that only the structures relating to the track of the elementary stream of the depth image are shown in FIG. 42.

As shown in FIG. 42, in the moov box, a trak box of a track of the elementary stream of the depth image (Depth Track) is arranged. This trak box is similar to that in the first embodiment except that depth_representation_type is described in the stsd box, and the stsd box, the sbgp box, the sgpd box and the like are arranged in this trak box.

In the mdat box, the elementary stream (Depth Stream) of the depth image is arranged in units of samples as the elementary stream of the track of the elementary stream of the depth image.

(Description Method of depth_representation_type in stsd Box)

FIG. 43 is a diagram showing an example of a description method of depth_representation_type in the stsd box.

In the example in FIG. 43, the depth image is encoded by the AVC method, and the hierarchical structure of the boxes of the MP4 file has the hierarchical structure in FIG. 24.

In this case, in a first description method, the structure of the avcC box of the lower layer of the stsd box is the same as the structure in FIG. 25. In addition, in DepthRepresentationInformationBox arranged in the avcC box, depth_representation_type in FIG. 13 is described as shown in FIG. 43.

Note that, although not shown, in a case where the encoding method of the depth image is the HEVC method, the MVD method, the MV-HEVC method or the like, similarly to the case in FIG. 43, depth_representation_type in FIG. 13 is described in the box in which Config information of each encoding method is described.

As described above, by describing depth_representation_type in the same box as the Config information, the reproduction apparatus 13 can determine whether or not the depth information can be generated by using depth_representation_type at the timing of processing the Config information.

Alternatively, depth_representation_type may be described in VisualSampleEntry of the lower layer of the stsd box. In this case, the structure of VisualSampleEntry is the same as the structure in FIG. 28, and the structure of DepthRepresentationInformationBox arranged in VisualSampleEntry is the same as the structure in FIG. 43. In a case where depth_representation_type is described in VisualSampleEntry, only VisualSampleEntry is expanded in order to enable depth_representation_type to be described, and it is unnecessary to expand for each encoding method unlike the case of describing in the same box as the Config information.

Moreover, depth_representation_type may be described in the schi box indicating the contents of the post-processing of the lower layer of the stsd box. Since depth_representation_type is information used for the depth information generation processing as the post-processing after the decoding processing, convenience can be improved by describing the information in the schi box. Furthermore, similarly to the case of describing depth_representation_type in VisualSampleEntry, only the schi box is expanded so as to enable depth_representation_type to be described.

(Explanation of Processing of Information Processing System)

The file generation processing of the file generation apparatus 11 in the fourth embodiment is similar to the file generation processing in FIG. 20, except that depth_representation_type is also arranged in the stsd box in the MP4 file. In addition, the decoding processing of the reproduction apparatus 13 in the fourth embodiment is the same as the decoding processing in FIG. 22. Therefore, hereinafter, the depth information generation processing of the reproduction apparatus 13 in the fourth embodiment will be described when a sample, which is the elementary stream of the depth image, is to be currently reproduced.

Figure 44:
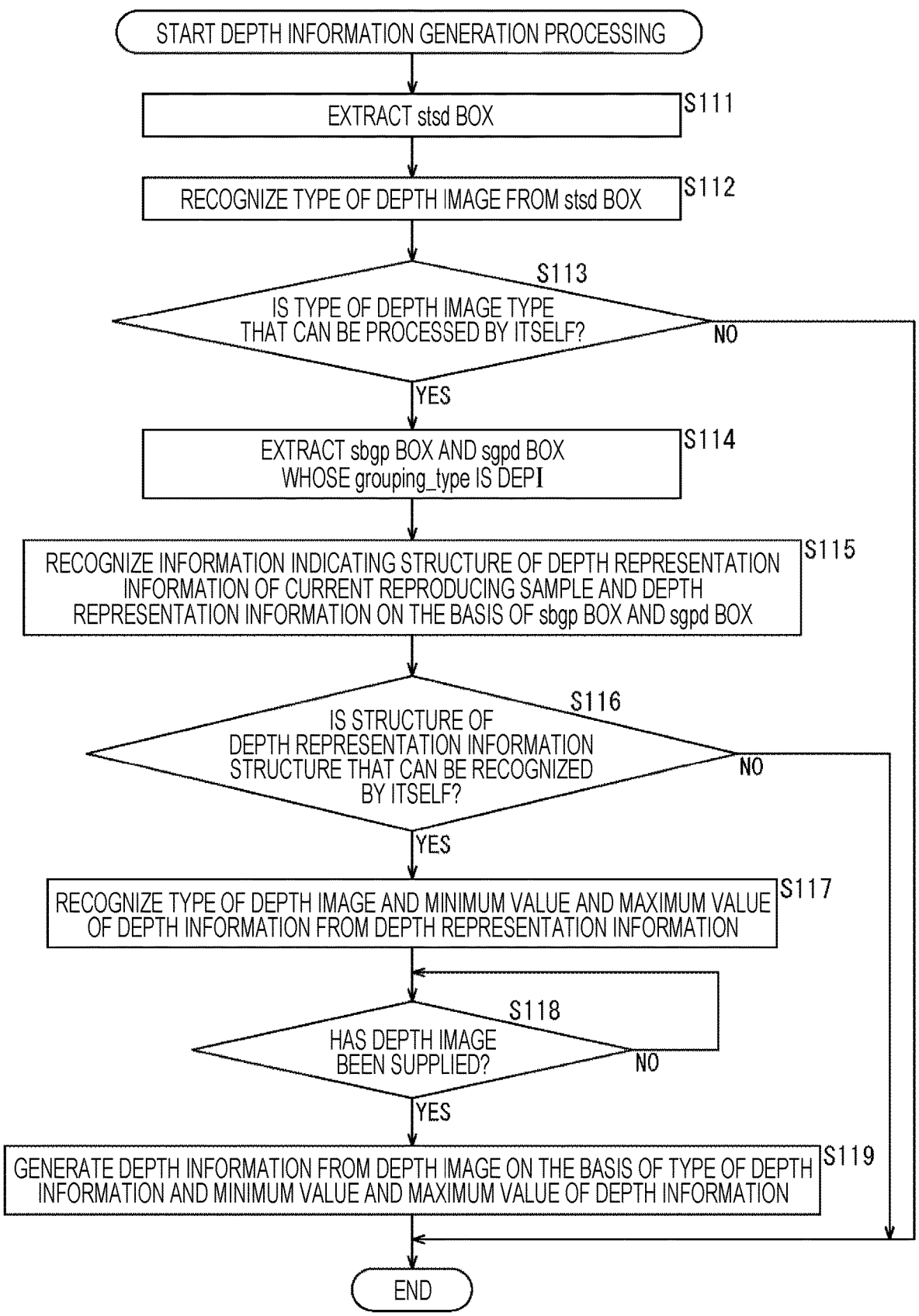
FIG. 44 is a flowchart for explaining the depth information generation processing in the fourth embodiment.

FIG. 44 is a flowchart for explaining that depth information generation processing.

In Step S111 in FIG. 44, the reproducing control unit 61 of the reproduction apparatus 13 extracts the stsd box of the track including the current reproducing sample from the MP4 file and supplies the box to the analysis unit 62.

In Step S112, the analysis unit 62 recognizes the type of the depth image from depth_representation_type of the stsd box and supplies the type to the depth information generation unit 81. In Step S113, the depth information generation unit 81 determines whether or not the type of the depth image is a type that can be processed by itself.

In a case where the type of the depth image is determined to be the type that can be processed by itself in Step S113, the depth information generation unit 81 decides that the generation of the depth information is possible, and the processing proceeds to Step S114. Since the processing in Steps S114 to S119 are similar to the processing in Steps S51 to S56 in FIG. 23, the descriptions thereof will be omitted.

On the other hand, in a case where the type of the depth image is determined to be not the type that can be processed by itself in Step S113, the depth information generation unit 81 decide that the generation of the depth information is impossible, and the processing ends.

As described above, in the fourth embodiment, depth_representation_type, which is less likely to change for each sample in the depth_representation_information and used for judging whether or not the depth information can be generated, is arranged in the stsd box. Therefore, the reproduction apparatus 13 can judge whether or not the depth information can be generated by using only the stsd box.

That is, the reproduction apparatus 13 does not needs to perform complicated processing of recognizing the group of the current reproducing sample from the sbgp box and recognizing depth_representation_type of that group from the sgpd box in order to judge whether or not the depth information can be generated. As a result, the reproduction apparatus 13 can efficiently perform the depth information generation processing.

Moreover, as for the information representing the minimum value and the maximum value of the depth information, which is highly likely to change for each sample of the depth representation information, samples with the same information are grouped, and only information different from each other is described in the MP4 file among the common information in the sample of each group. Therefore, it is possible to prevent the information representing the minimum value and the maximum value of the same depth information from being redundantly described in the MP4 file and to efficiently describe the information representing the minimum value and the maximum value of the depth information. As a result, it is possible to reduce the size of the entire information representing the minimum value and the maximum value of the depth information in the MP4 file.

Moreover, in the fourth embodiment, similarly to the first embodiment, the depth representation information is described outside the elementary stream in the MP4 file so that the processing of the reproduction apparatus 13 is facilitated.

Note that, in the fourth embodiment, similarly to the second embodiment, the structure itself of the depth representation information may be the structure of the NAL unit of the SEI or the SEI of the depth representation information included in the elementary stream of the depth image.

Furthermore, the information indicating the structure of the depth representation information may also be described in the stsd box together with depth_representation_type. Further, in the sgpd box, depth_representation_type described in the stsd box and the information indicating the structure of the depth representation information may be not arranged.

Fifth Embodiment (Structural Examples of moov Box and mdat Box)

The configuration of an information processing system according to a fifth embodiment, to which the present disclosure is applied, is the same as the configuration in the third embodiment, except that depth_representation_type is also arranged in the stsd box of the track of the elementary stream of the depth image similarly to the fourth embodiment.

Figure 45:
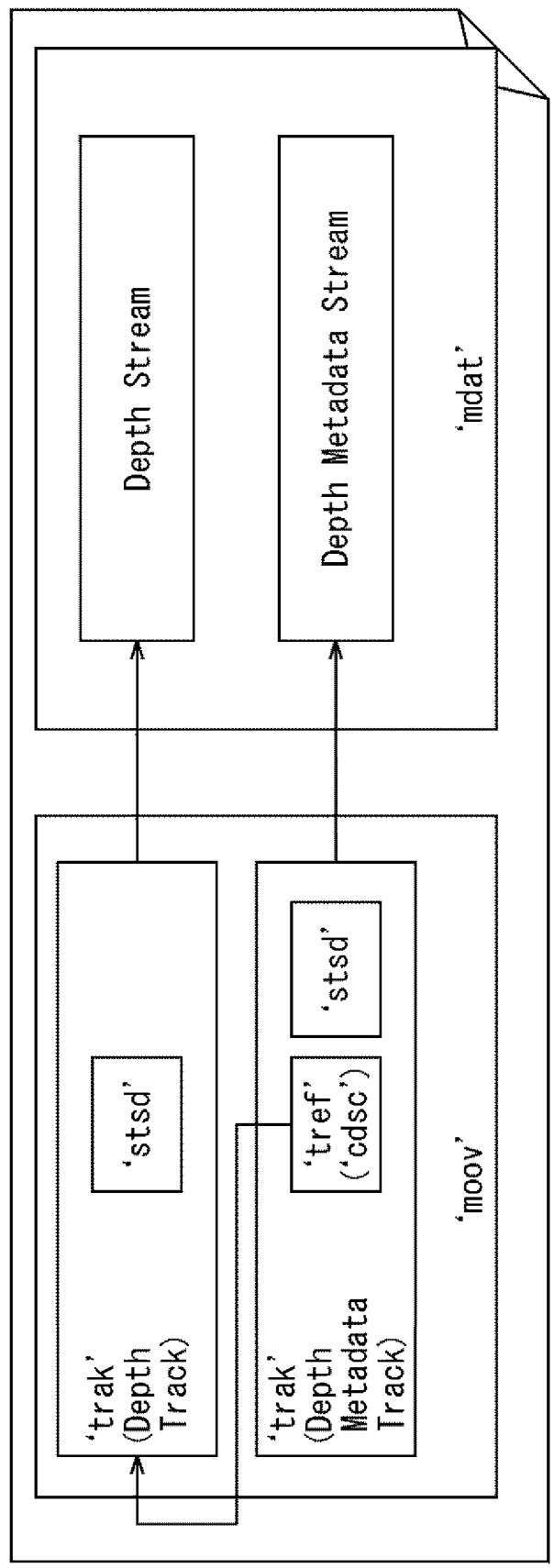
FIG. 45 is a diagram showing structural examples of a moov box and an mdat box in a fifth embodiment.

FIG. 45 is a diagram showing structural examples of the moov box and the mdat box of the MP4 file in the fifth embodiment.

The structures of the moov box and the mdat box in FIG. 45 are different from the structures in FIG. 36 in that depth_representation_type is described in the stsd box arranged in a trak box of a track (Depth Track) of the elementary stream of the depth image in the moov box. The description method of depth_representation_type in the stsd box is similar to that in the fourth embodiment.

The file generation processing of the file generation apparatus 11 in the fifth embodiment is the same as the file generation processing in the third embodiment, except that depth_representation_type is also arranged in the stsd box of the track of the elementary stream of the depth image. In addition, the decoding processing of the reproduction apparatus 13 in the fifth embodiment is the same as the decoding processing in FIG. 22.

Moreover, the depth information generation processing of the reproduction apparatus 13 in the fifth embodiment when a sample, which is the elementary stream of the depth image, is to be currently reproduced is the same as the depth information generation processing in FIG. 41, except that the processing in Steps S111 to S113 in FIG. 44 are performed before the processing in Step S91.

As described above, since the fifth embodiment is a combination of the third embodiment and the fourth embodiment, the fifth embodiment has the effects of both the third embodiment and the fourth embodiment.

Sixth Embodiment (Configuration Example of Information Processing System According to Sixth Embodiment)

Figure 46:
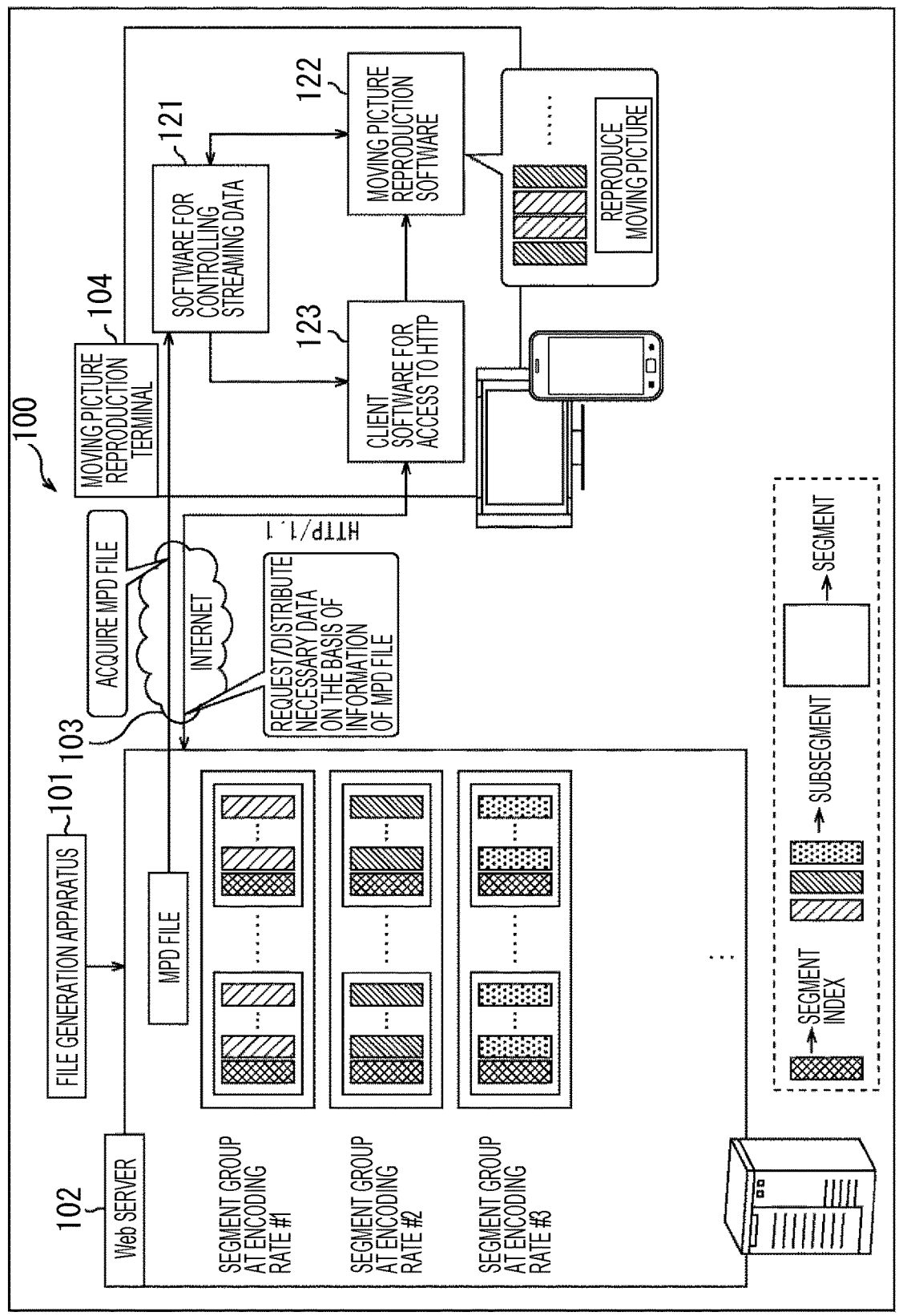
FIG. 46 is a diagram for explaining the overview of an information processing system in a sixth embodiment to which the present disclosure is applied.
Figure 47:
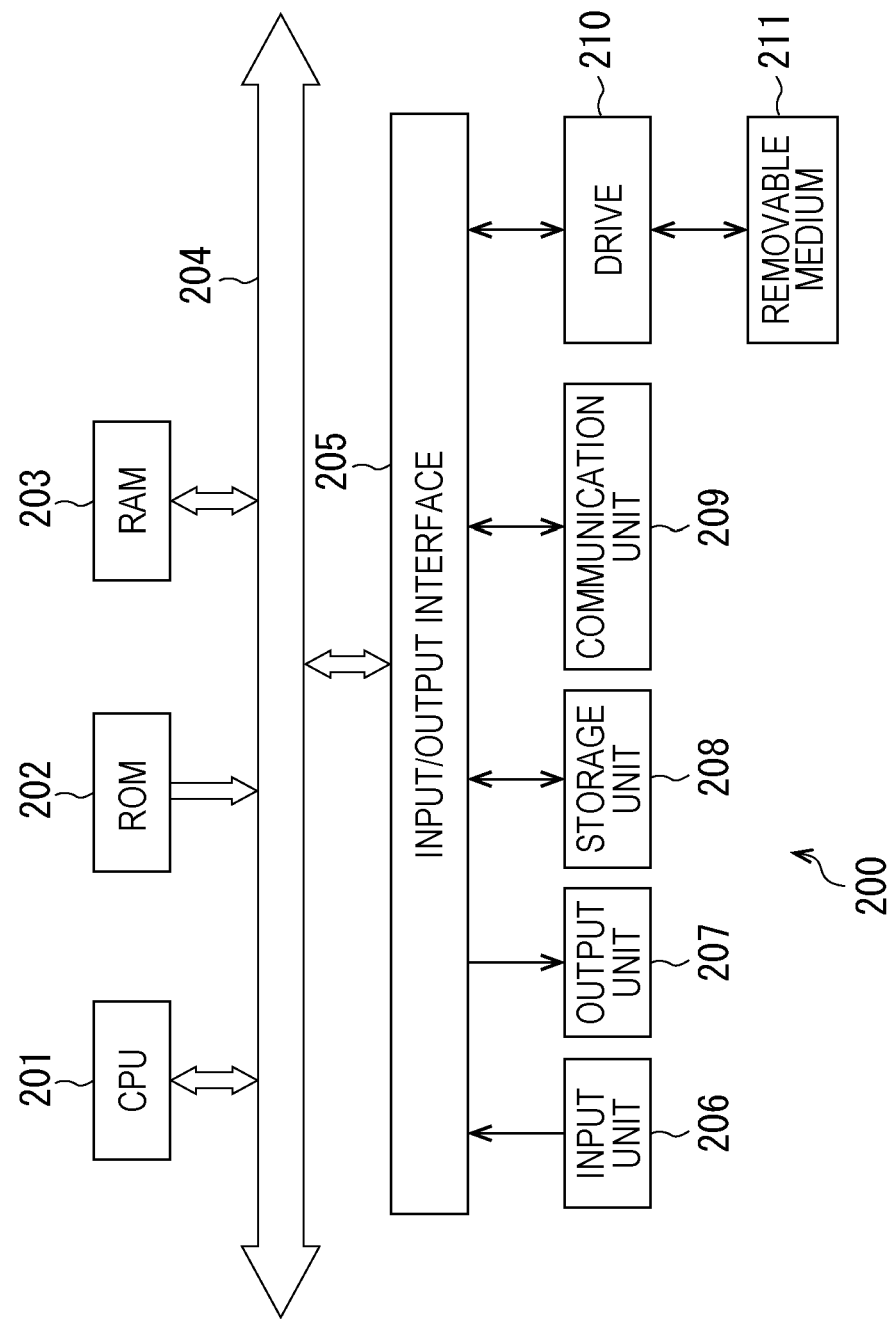
FIG. 47 is a block diagram showing a configuration example of hardware of a computer.

FIG. 46 is a diagram for explaining the overview of the information processing system in a sixth embodiment to which the present disclosure is applied.

An information processing system 100 in FIG. 46 is configured by connecting a Web server 102, which is connected to a file generation apparatus 101, and a moving picture reproduction terminal 104 via an Internet 103.

In the information processing system 100, the Web server 102 distributes the file of the moving picture contents generated by the file generation apparatus 101 with MPEG-DASH to the moving picture reproduction terminal 104.

Specifically, the configuration of the file generation apparatus 101 (information processing apparatus) is similar to the configurations of the file generation apparatuses 11 in the first to fifth embodiments, except that encoding is performed at a plurality of encoding rates, an MP4 file is generated in units of segments for each encoding rate, a media presentation description (MPD) file, which manages the MP4 file and the like, is generated, and the MP4 file the MPD file are recorded on the Web server 102 instead of the recording medium 12. A segment is unit of time from several seconds to about ten seconds.

Note that the encoding is performed at a plurality of encoding rates in the example in FIG. 46, but the encoding may be performed under conditions other than the plurality of encoding rates (e.g., the size of the image, and the like).

In addition, the number of different conditions may be two or more. The file generation apparatus 101 uploads the MP4 file and the MPD file to the Web server 102.

The Web server 102 stores the MP4 file and the MPD file uploaded from the file generation apparatus 101. In the example in FIG. 46, there are three types of encoding rates, and the MP4 file of each segment is stored for each of the three encoding rates. In response to a request from the moving picture reproduction terminal 104, the Web server 102 transmits the MP4 file and MPD file being stored to the moving picture reproduction terminal 104.

The moving picture reproduction terminal 104 (information processing apparatus) executes software for controlling streaming data (hereinafter referred to as control software) 121, moving picture reproduction software 122, client software for access to hypertext transfer protocol (HTTP) (hereinafter referred to as access software) 123 and the like.

The control software 121 is software which controls data to be streamed from the Web server 102. Specifically, the control software 121 causes the moving picture reproduction terminal 104 to acquire the MPD file from the Web server 102.

The control software 121 also commands the access software 123 to make a transmission request of the sample or the box of the current reproducing MP4 file on the basis of the MPD file and the current reproducing information representing the time and the like of the current reproduction designated by the moving picture reproduction software 122.

The moving picture reproduction software 122 is software which reproduces the sample acquired from the Web server 102. The moving picture reproduction software performs the processing similar to those of the reproduction apparatuses 13 in the first to fifth embodiments, except that the sample or the box recorded on the Web server 102, not on the recording medium 12, are extracted.

Specifically, the moving picture reproduction software 122 controls the moving picture reproduction terminal 104 by designating the current reproducing information to the control software 121 and extracts the current reproducing sample, the sbgp Box and the sgpd box from the MP4 file similarly to the reproducing control unit 61. In addition, similarly to the analysis unit 62, the decoding unit 63 and the display generation unit 64, the moving picture reproduction software 122 decodes the current reproducing sample, converts the depth image obtained as a result of the decoding into the depth information, and generates the 3D image.

The access software 123 is software which controls communication with the Web server 102 via the Internet 103 by using HTTP. Specifically, in response to a command from the control software 121, the access software 123 causes the moving picture reproduction terminal 104 to transmit a transmission request of the sample or the box of the current reproducing MP4. In addition, in response to that transmission request, the access software 123 causes the moving picture reproduction terminal 104 to start receiving the sample or the box transmitted from the Web server 102.

Seventh Embodiment (Explanation of Computer to which Present Disclosure is Applied)

The series of processing described above can be executed by hardware or can be executed by software. In a case where the series of processing is executed by the software, a program configuring that software is installed in a computer. Herein, the computer includes a computer incorporated into dedicated hardware and, for example, a general-purpose personal computer capable of executing various functions by being installed with various programs.

FIG. 47 is a block diagram showing a configuration example of hardware of a computer which executes the aforementioned series of processing by a program.

In a computer 200, a central processing unit (CPU) 201, a read only memory (ROM) 202, and a random access memory (RAM) 203 are connected to each other by a bus 204.

The bus 204 is further connected to an input/output interface 205. To the input/output interface 205, an input unit 206, an output unit 207, a storage unit 208, a communication unit 209 and a drive 210 are connected.

The input unit 206 includes a keyboard, a mouse, a microphone and the like. The output unit 207 includes a display, a speaker and the like. The storage unit 208 includes a hard disk, a nonvolatile memory and the like. The communication unit 209 includes a network interface and the like. The drive 210 drives a removable medium 211 such as a magnetic disk, an optical disk, a magneto-optical disk or a semiconductor memory.

In the computer 200 configured as described above, the CPU 201 loads, for example, a program stored in the storage unit 208 into the RAM 203 via the input/output interface 205 and the bus 204 and executes the program, thereby performing the aforementioned series of processing.

The program executed by the computer 200 (CPU 201) can be, for example, recorded on the removable medium 211 as a package medium or the like to be provided. Moreover, the program can be provided via a wired or wireless transmission medium such as a local area network, the Internet, digital satellite broadcasting or the like.

In the computer 200, the program can be installed in the storage unit 208 via the input/output interface 205 by attaching the removable medium 211 to the drive 210. Furthermore, the program can be received by the communication unit 209 via the wired or wireless transmission medium and installed in the storage unit 208. In addition, the program can be installed in the ROM 202 or the storage unit 208 in advance.

Note that the program executed by the computer 200 may be a program in which the processing are performed in time series according to the order described in this description, or may be a program in which the processing are performed in parallel or at necessary timings such as when a call is made.

Moreover, in this description, the system means a group of a plurality of constituent elements (apparatuses, modules (parts) and the like), and it does not matter whether all constituent elements are in the same housing or not. Therefore, a plurality of apparatuses, which are housed in separate housings and connected via a network, and one apparatus, in which a plurality of modules are accommodated in one housing, are both systems.

Note that the effects described in this description are merely examples and are not limited, and other effects may be provided.

Moreover, the embodiments of the present disclosure are not limited to the aforementioned embodiments, and various modifications can be made in a scope without departing from the gist of the present disclosure.

Note that the present disclosure may also adopt the following configurations.

(1)

An information processing apparatus including
a file generation unit which samples and arranges an encoded stream obtained by encoding a depth image, which includes pixel values obtained by quantizing depth information representing a position of each of pixels in a depth direction, as well as groups samples with same depth representation information regarding the depth image and generates a file in which the depth representation information of each group is described.

(2)

The information processing apparatus according to (1), in which the file generation unit is configured to arrange, in the file, a group information box, which describes the depth representation information different from each other among the depth representation information of each group, and a group box, which describes information specifying the samples of each group and information specifying the depth representation information.

(3)

The information processing apparatus according to (2), in which the file generation unit is configured to describe information indicating structure of the depth representation information as schem_uri of the group information box.

(4)

The information processing apparatus according to (2), in which the file generation unit is configured to describe information indicating structure of the depth representation information as a field of the group information box.

(5)

The information processing apparatus according to (2), in which the file generation unit is configured to describe information indicating structure of the depth representation information in the group box.

(6)

The information processing apparatus according to (1), in which the file generation unit is configured to arrange, in the file, a box which describes information specifying the samples of each group and the depth representation information.

(7)

The information processing apparatus according to (1), in which the file generation unit is configured to sample and arrange the depth representation information of each group in the file as a sample of a track different from a sample of the encoded stream.

(8)

The information processing apparatus according to (7), in which the file generation unit is configured to describe, in the file, information specifying a track for the encoded stream as a track referred to by a track for the depth representation information.

(9)

The information processing apparatus according to any one of (1) to (8), in which the depth representation information includes information indicating a type of the depth image.

(10)

The information processing apparatus according to any one of (1) to (8), in which the depth representation information includes a minimum value and a maximum value of the depth information.

(11)

The information processing apparatus according to (10), in which the file generation unit is configured to describe, in the file, information indicating a type of the depth image.

(12)

The information processing apparatus according to any one of (1) to (11), in which structure of the depth representation is structure of supplemental enhancement information (SEI) or a network abstraction layer (NAL) unit of the SEI which includes the depth representation information of the encoded stream.

(13)

An information processing method including a file generation step, in which an information processing apparatus samples and arranges an encoded stream obtained by encoding a depth image, which includes pixel values obtained by quantizing depth information representing a position of each of pixels in a depth direction, as well as groups samples with same depth representation information regarding the depth image and generates a file in which the depth representation information of each group is described.

(14)

An information processing apparatus including a depth information generation unit which samples and arranges an encoded stream obtained by encoding a depth image, which includes pixel values obtained by quantizing depth information representing a position of each of pixels in a depth direction, as well as groups samples with same depth representation information regarding the depth image and generates the depth information from the depth image on the basis of the depth representation information in a file in which the depth representation information of each group is described.

(15)

The information processing apparatus according to (14), in which, in the file, a group information box, which describes the depth representation information different from each other among the depth representation information of each group, and a group box, which describes information specifying the samples of each group and information specifying the depth representation information are arranged.

(16)

The information processing apparatus according to (15), in which, in the file, information indicating structure of the depth representation information is described as schem_uri of the group information box.

(17)

The information processing apparatus according to (15), in which, in the file, information indicating structure of the depth representation information is described as a field of the group information box.

(18)

The information processing apparatus according to (15), in which, in the file, information indicating structure of the depth representation information is described in the group box.

(19)

The information processing apparatus according to (14), in which, in the file, a box which describes information specifying the samples of each group and the depth representation information is arranged.

(20)

The information processing apparatus according to (14), in which the depth representation information of each group is sampled and arranged as a sample of a track different from a sample of the encoded stream.

(21)
The information processing apparatus according to (20), in which, in the file, information specifying a track for the encoded stream is described as a track referred to by a track for the depth representation information.

(22)
The information processing apparatus according to any one of (14) to (21), in which
the depth representation information includes information indicating a type of the depth image.

(23)
The information processing apparatus according to any one of (14) to (21), in which
the depth representation information includes a minimum value and a maximum value of the depth information.

(24)
The information processing apparatus according to (23), in which
the file includes information indicating a type of the depth image.

(25)
The information processing apparatus according to any one of (14) to (24), in which
structure of the depth representation is structure of supplemental enhancement information (SEI) or a network abstraction layer (NAL) unit of the SEI which includes the depth representation information of the encoded stream.

(26)
An information processing method including a depth information generation step,
in which an information processing apparatus samples and arranges an encoded stream obtained by encoding a depth image, which includes pixel values obtained by quantizing depth information representing a position of each of pixels in a depth direction, as well as groups samples with same depth representation information regarding the depth image and generates the depth information from the depth image on the basis of the depth representation information in a file in which the depth representation information of each group is described.

REFERENCE SIGNS LIST

11 File generation apparatus
13 Reproduction apparatus
34 File generation unit
81 Depth information generation unit
101 File generation apparatus
104 Moving picture reproduction terminal
122 Moving picture reproduction software

The invention claimed is:

1. An information processing apparatus comprising circuitry configured to
acquire depth information of each pixel of a texture image representing a position of each pixel in a depth direction, and depth representation information including a minimum value and a maximum value of the depth information,
generate, on the basis of the depth representation information, a depth image obtained by quantizing the depth information,
arrange, in a first track of an MP4 file, an encoded stream obtained by encoding the depth image in units of samples,
group one or more consecutive samples having same depth representation information into respective groups,
arrange, as a sample in a second track of the MP4 file different from the first track, the depth representation information of each of the respective groups, wherein each sample arranged in the second track describes different depth representation information from each other, and
describe, in the MP4 file, information specifying the first track for the encoded stream as a track referred to by the second track for the depth representation information.

2. The information processing apparatus according to claim 1, wherein
the circuitry is further configured to
arrange, in the MP4 file, a group information box which describes the depth representation information different from each other among the depth representation information of each group, and a group box which describes information specifying a number of the consecutive samples of each group and information specifying the depth representation information described in the group information box, and
describe information indicating structure of the depth representation information as scheme_uri of the group information box.

3. The information processing apparatus according to claim 2, wherein
the circuitry is further configured to describe information indicating structure of the depth representation information as a field of the group information box.

4. The information processing apparatus according to claim 2, wherein
the circuitry is further configured to describe information indicating structure of the depth representation information in the group box.

5. The information processing apparatus according to claim 1, wherein
the circuitry is further configured to arrange, in the MP4 file, a box which describes information specifying the samples of each group and the depth representation information.

6. The information processing apparatus according to claim 1, wherein
the depth representation information includes information indicating a type of the depth image, and
the type of the depth image indicates that the depth image is an image with pixel values which are obtained by quantizing the depth information, and that the depth information is one of:
an inverse of a depth representing a position of a subject in a depth direction quantized uniformly;
disparity quantized uniformly;
depth quantized uniformly; and
disparity quantized using a nonlinear function.

7. The information processing apparatus according to claim 1, wherein
the circuitry is further configured to describe, in the MP4 file, information indicating a type of the depth image, and
the type of the depth image indicates that the depth image is an image with pixel values which are obtained by quantizing the depth information, and that the depth information is one of:
an inverse of a depth representing a position of a subject in a depth direction quantized uniformly;
disparity quantized uniformly;
depth quantized uniformly; and
disparity quantized using a nonlinear function.

8. The information processing apparatus according to claim 1, wherein
structure of the depth representation information is structure of supplemental enhancement information (SEI) or a network abstraction layer (NAL) unit of the SEI which includes the depth representation information of the encoded stream.

9. An information processing method comprising:
acquiring depth information of each pixel of a texture image representing a position of each pixel in a depth direction, and depth representation information including a minimum value and a maximum value of the depth information;
generating, on the basis of the depth representation information, a depth image obtained by quantizing the depth information;
arranging, in a first track of an MP4 file, an encoded stream obtained by encoding a depth image in units of samples;
grouping one or more consecutive samples having same depth representation information into respective groups;
arranging, as a sample in a second track of the MP4 file different from the first track, the depth representation information of each of the respective groups, wherein each sample arranged in the second track describes different depth representation information from each other; and
describing, in the MP4 file, information specifying the first track for the encoded stream as a track referred to by the second track for the depth representation information.

10. An information processing apparatus comprising:
circuitry configured to:
extract a currently reproducing sample of an mp4 file;
recognize, in a second track of the mp4 file, depth representation information for each of a number of consecutive samples grouped into respective groups, wherein the consecutive samples are arranged in a first track of the mp4 file and the depth representation information of each of the respective groups is arranged in the second track as a sample, wherein each of the respective groups includes a respective one of the consecutive samples having same depth representation information grouped therein, and wherein each sample arranged in the second track describes different depth representation information from each other;
recognize a minimum value and a maximum value of the depth representation information;
recognize, in a first track of the mp4 file, an encoded stream obtained by encoding a depth image in units of samples, wherein the first track is different than the second track and is referred to by the second track;
dequantize the depth image based on the minimum value and the maximum value; and
generate depth information from the depth image,
wherein the depth information represents a position of each pixel of a texture image in a depth direction.

11. An information processing method comprising:
extracting a currently reproducing sample of an mp4 file;
recognizing, in a second track of the mp4 file, depth representation information for each of a number of consecutive samples grouped into respective groups, wherein the consecutive samples are arranged in a first track of the mp4 file and the depth representation information of each of the respective groups is arranged in the second track as a sample, wherein each of the respective groups includes a respective one of the consecutive samples having same depth representation information grouped therein, and wherein each sample arranged in the second track describes different depth representation information from each other;
recognizing a minimum value and a maximum value of the depth representation information;
recognizing, in a first track of the mp4 file, an encoded stream obtained by encoding a depth image in units of samples, wherein the first track is different from the second track and is referred to by the second track;
dequantizing a depth image on the basis of the minimum value and the maximum value; and
generating depth information from the depth image,
wherein the depth information represents a position of each pixel of a texture image in a depth direction.

* * * * *